United States Patent
Mizutani et al.

(10) Patent No.: US 7,702,996 B2
(45) Date of Patent: Apr. 20, 2010

(54) APPARATUS AND METHOD FOR CONVERTING MULTIMEDIA CONTENTS

(75) Inventors: Masami Mizutani, Kawasaki (JP); Kazumi Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 888 days.

(21) Appl. No.: 10/774,630

(22) Filed: Feb. 10, 2004

(65) Prior Publication Data
US 2004/0186723 A1    Sep. 23, 2004

(30) Foreign Application Priority Data
Mar. 19, 2003    (JP) ............................. 2003-076197

(51) Int. Cl.
*G06F 15/00* (2006.01)
(52) U.S. Cl. ...................... 715/203; 715/210; 715/246; 715/253
(58) Field of Classification Search ............. 715/500.1, 715/501.1
See application file for complete search history.

(56) References Cited

U.S. PATENT DOCUMENTS

| | | | | |
|---|---|---|---|---|
| 6,260,011 | B1 * | 7/2001 | Heckerman et al. | 704/235 |
| 2002/0004413 | A1 * | 1/2002 | Inoue | 455/566 |
| 2002/0175928 | A1 | 11/2002 | Kanbayashi | 345/700 |
| 2002/0184197 | A1 | 12/2002 | He et al. | 707/3 |
| 2003/0105880 | A1 * | 6/2003 | Jasinschi | 709/247 |
| 2003/0152207 | A1 * | 8/2003 | Ryan | 379/201.04 |
| 2007/0083886 | A1 * | 4/2007 | Kauffman et al. | 725/34 |

FOREIGN PATENT DOCUMENTS

| | | |
|---|---|---|
| EP | 0 905 679 A2 | 3/1999 |
| EP | 1 170 968 | 1/2002 |
| GB | 2365735 | 2/2002 |
| JP | 5-233719 | 9/1993 |
| JP | 11-175092 | 7/1999 |
| JP | 2000-261754 | 9/2000 |
| JP | 2001-275058 | 10/2001 |
| WO | WO 01/11462 | 2/2001 |

OTHER PUBLICATIONS

Nielsen, Jakob, Designing Web Usability, Publisher: Peachpit Press, Pub Date: Dec. 20, 1999, pp. 1-4.*
Oliver, Dick et al., Sams Teach Yourself HTML and XHTML in 24 Hours, Fifth Edition, Publisher: Sams, Pub Date: Feb. 15, 2001, pp. 1-3.*

* cited by examiner

*Primary Examiner*—Nathan Hillery

(57) ABSTRACT

In a multimedia contents converting apparatus configured to convert input multimedia contents to be displayed with a predetermined size, including text media and the other media, into output multimedia contents to be displayed with a size smaller than the predetermined size, a spatiotemporal layout information setting processing unit sets a display time of the text media included in layout information on the basis of a display time of the text media calculated in a text display time calculation processing unit, and sets a playing time of the other media included in the layout information on the basis of the display time of the text media set as the layout information.

15 Claims, 15 Drawing Sheets

FIG. 4

```
<smil>
<head>
</head>
<body>
   <seq>
      <par>
         <video id="vseg1" src="v1.mpg" clip-begin="10s" clip-end="20s"/>
         <audio id="aseg1" src="a1.mpg" clip-begin="40s" clip-end="50s"/>     ①
         <text id="tseg1" dur="10s" src="tx1.html"/>
      </par>

<par>
         <seq>
            <par>
               <video id="vseg2" src="v2.mpg" clip-begin="0s" clip-end="10s"/>    ②
               <text id="tseg2" dur="10s" src=tx2.html"/>
            </par>
            <par>
               <video id="vseg3" src="v3.mpg" clip-begin="20s" clip-end="40s"/>
               <seq>
                  <text id="tseg3" dur="10s" src=tx3.html"/>                      ③
                  <text id="tseg4" dur="10s" src=tx4.html"/>
               <seq>
            </par>
         </seq>
         <audio id="aseg2" src="a2.mpg" clip-begin="10s" clip-end="40s"/>    ④
      </par>
   </seq>
</body>
</smil>
```

FIG. 5(A) v1.mpg 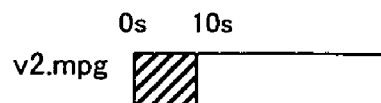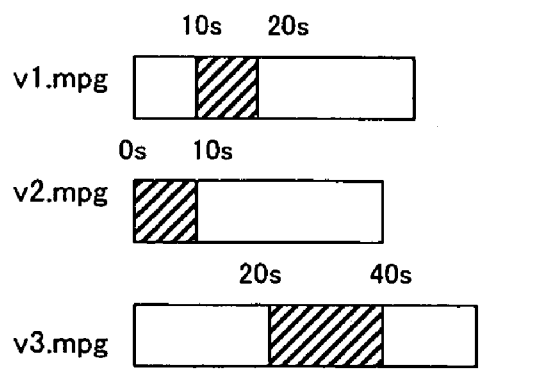
FIG. 5(B) v2.mpg
FIG. 5(C) v3.mpg 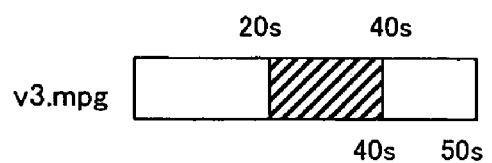
FIG. 5(D) a1.mpg 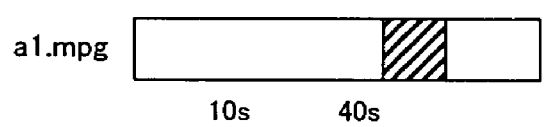
FIG. 5(E) a2.mpg 
FIG. 5(F) t1.mpg 
FIG. 5(G) t2.mpg 
FIG. 5(H) t3.mpg 
FIG. 5(I) t4.mpg 

FIG. 7(A)

OUTPUT FILE FORMAT INFORMATION

| ATTRIBUTE | VALUE |
|---|---|
| FILE FORMAT | 3GPP TS.26.234 V.5.1.0 |

FIG. 7(B)

OUTPUT PRESENTATION FORM INFORMATION

| ATTRIBUTE | VALUE |
|---|---|
| PRESENTATION FORM | [METHOD 1-1] [METHOD 1-2] [METHOD 1-3] [METHOD 2] |

FIG. 7(C)

VIDEO RENDERING REGION TRANSITION ORDER INFORMATION

| TRANSITION ORDER | RENDERING REGION ID |
|---|---|
| 1 | VRegionID1 |
| 2 | VRegionID2 |
| 3 | VRegionID3 |
| 4 | VRegionID4 |
| ... | ... |

FIG. 7(D)

TEXT RENDERING REGION TRANSITION ORDER INFORMATION

| TRANSITION ORDER | RENDERING REGION ID |
|---|---|
| 1 | TRegionID1 |
| 2 | TRegionID2 |
| 3 | TRegionID3 |
| 4 | TRegionID4 |
| ... | ... |

FIG. 7(F)

VIDEO DISPLAY FORM INFORMATION

| ATTRIBUTE | VALUE |
|---|---|
| ENCODING METHOD | MPEG-4 Video SP@L0 |
| FRAME RATE | MAXIMUM OF 15 fps |
| BIT RATE | MAXIMUM OF 64 kbps |

FIG. 7(G)

TEXT DISPLAY FORM INFORMATION

| ATTRIBUTE | VALUE |
|---|---|
| DATA TYPE | 3GPP TimedText |
| FONT NAME | Serif |
| FONT SIZE | 9pt |
| CHARACTER SPACING | 1pt |
| PITCH | FIXED |
| ORNAMENT METHOD | SCROLL INFORMATION |

FIG. 7(H)

SCROLL INFORMATION

| ATTRIBUTE | VALUE |
|---|---|
| DIRECTION | LEFT → RIGHT |
| SPEED | 30pixcel/sec |

FIG. 7(E)

RENDERING REGION INFORMATION

| ATTRIBUTE | VALUE |
|---|---|
| ID | VRegionID1 |
| DISPLAY MEDIA ASSORTMENT | VIDEO |
| DISPLAY POSITION | (0,0) |
| DISPLAY REGION | 176x144 |
| MEDIA DISPLAY FORM | VIDEO DISPLAY FORM INFORMATION |
| ID | TRegionID1 |
| DISPLAY MEDIA ASSORTMENT | TEXT |
| DISPLAY POSITION | (-12,144) |
| DISPLAY REGION | 200x10 |
| MEDIA DISPLAY FORM | TEXT DISPLAY FORM INFORMATION |
| ID | VRegionID2 |
| ... | ... |

FIG. 8(A)

VIDEO RENDERING REGION #1

| segID | PLAYING START TIME | PLAYING TIME PERIOD | ENTITY | START TIME | END TIME |
|---|---|---|---|---|---|
| 1 | 0s | 10s | v1.mpg | 10s | 20s |
| 2 | 10 | 10s | v2.mpg | 0s | 10s |
| 3 | 20 | 20s | v3.mpg | 20s | 40s |

FIG. 8(B)

VIDEO RENDERING REGION #n

| segID | PLAYING START TIME | PLAYING TIME PERIOD | ENTITY | START TIME | END TIME |
|---|---|---|---|---|---|
| ... | ... | ... | ... | ... | ... |

FIG. 8(C)

AUDIO RENDERING REGION #1

| segID | PLAYING START TIME | PLAYING TIME PERIOD | ENTITY | START TIME | END TIME |
|---|---|---|---|---|---|
| 1 | 0s | 10s | a1.mpg | 40s | 50s |
| 2 | 10 | 30s | a2.mpg | 10s | 40s |

FIG. 8(D)

AUDIO RENDERING REGION #m

| segID | PLAYING START TIME | PLAYING TIME PERIOD | ENTITY | START TIME | END TIME |
|---|---|---|---|---|---|
| ... | ... | ... | ... | ... | ... |

FIG. 8(E)

TEXT RENDERING REGION #1

| segID | PLAYING START TIME | PLAYING TIME PERIOD | ENTITY | START TIME | END TIME |
|---|---|---|---|---|---|
| 1 | 0s | 10s | t1.html | – | – |
| 2 | 10 | 10s | t2.html | – | – |
| 3 | 20 | 10s | t3.html | – | – |
| 4 | 30 | 10s | t4.html | – | – |

FIG. 8(F)

TEXT RENDERING REGION #k

| segID | PLAYING START TIME | PLAYING TIME PERIOD | ENTITY | START TIME | END TIME |
|---|---|---|---|---|---|
| ... | ... | ... | ... | ... | ... |

FIG. 9(A)

SPATIOTEMPORAL LAYOUT INFORMATION TABLE (METHOD 1)

| RENDERING REGION ID | MEDIA ASSORTMENT | SEGMENT | PLAYING TIME | PLAYING TIME PERIOD | EFFECT INSTRUCTION INFORMATION |
|---|---|---|---|---|---|
| VRegionID1 | VIDEO | Vseg#1···Vseg#s | 0 | TMP | REPEATED |
| TRegionID1 | TEXT | Tseg#1···Tseg#t | 0 | DurOf (Tseg#1 ··· Tseg#t) | FREEZE |
| ... | ... | ... | | ... | ... |

FIG. 9(B)

SEGMENT INFORMATION TABLE

| SEGMENT ID | MEDIA ASSORTMENT | PLAYING TIME PERIOD | LOCATION OF DATA | START TIME | END TIME |
|---|---|---|---|---|---|
| Vseg#1 | VIDEO | V#1_ed–v#1_st | URLv1 | v#1_st | v#1_ed |
| ... | ... | ... | ... | ... | ... |
| Vseg#s | VIDEO | V#s_ed–v#s_st | URLvs | v#s_st | v#s_ed |
| Tseg#1 | TEXT | DurOf(Tseg#1) | URLt1 | — | — |
| ... | ... | ... | ... | ... | ... |
| Tseg#t | TEXT | DurOf(Tseg#t) | URLts | — | — |
| OTHERS | ... | ... | ... | ... | ... |

FIG. 10(A)

SPATIOTEMPORAL LAYOUT INFORMATION TABLE (METHOD 2)

| RENDERING REGION ID | MEDIA ASSORTMENT | SEGMENT | PLAYING TIME | PLAYING TIME PERIOD |
|---|---|---|---|---|
| VRegionID1 | VIDEO | Vseg#1 · · · Vseg#s | 0 | DurOf(Vseg#1 · · · Vseg#s) |
| TRegionID1 | TEXT | Tseg#1 · · · Tseg#s | 0 | DurOf(Tseg#1 · · · Tseg#s) |
| OTHERS | ... | ... | ... | ... |

FIG. 10(B)

SEGMENT INFORMATION TABLE

| SEGMENT ID | MEDIA ASSORTMENT | PLAYING TIME PERIOD | EFFECT | LOCATION OF ENTITY | START TIME | END TIME |
|---|---|---|---|---|---|---|
| Vseg#1 | VIDEO | Max(DurOf(Tseg#1) ,(v#1_ed−v#1_st)) | FREEZE | URLv1 | v#1_st | v#1_ed |
| ... | ... | ... | ... | ... | ... | ... |
| Vseg#s | VIDEO | Max(DurOf(Tseg#s) ,(v#s_ed−v#s_st)) | FREEZE | URLvs | v#s_st | v#s_ed |
| Tseg#1 | TEXT | Max(DurOf(Tseg#1) , (v#1_ed−v#1_st)) | N/A | URLt1 | — | — |
| ... | ... | ... | ... | ... | ... | ... |
| Tseg#s | TEXT | Max(DurOf(Tseg#s) ,(v#s_ed−v#s_st)) | N/A | URLts | — | — |
| OTHERS | ... | ... | ... | ... | ... | ... |

APPARATUS AND METHOD FOR CONVERTING MULTIMEDIA CONTENTS

BACKGROUND OF THE INVENTION (1) Field of the Invention

The present invention relates to a multimedia contents converting apparatus and method suitable, for example, for use in the conversion of multimedia contents (or content) available in a terminal such as a personal computer (PC) using a broadband line so that the multimedia contents are audible and visible in a portable terminal using a portable terminal communication line, and further to a multimedia contents conversion program and a computer-readable storage medium storing a multimedia contents conversion program.

(2) Description of the Related Art

So far, as a means of editing multimedia contents, for example, there has been known a technique in which, for the purpose of editing in units of segments in which text media and motion picture media (video media) are associated with each other, in a state where the association between the text media and the motion picture (moving picture) media is placed under control, the descriptions (descriptive text) about image scenes constituting a digest picture are connected through the use of appropriate connection representations according to the contexts of the image scenes to automatically produce the descriptions about the picture contents (for example, see Japanese Patent Laid-Open No. 2001-275058).

In addition, as the means of associating a plurality of media with each other, for example, there are the techniques disclosed in Japanese Patent Laid-Open Nos. HEI 5-233719 and HEI 11-175092.

Meanwhile, in the recent years, for constructing a presentation through the use of the spatiotemporal (space-time) combinations of one or more media, there has been given multimedia contents produced with a language such as SMIL (Synchronized Multimedia Integration Language) which enables the description of the information on media playing sequence control or media playing synchronization control.

The multimedia contents produced with such a language has principally been provided as PC-oriented contents capable of using a broadband line which enables the transmission/reception of a large-capacity (wide band) data at a high communication speed of approximately several Mbps.

On the other hand, presently, the communication line for portable terminals such as portable telephones can provide the transmission/reception of only the small-capacity (narrow band) data at a low communication speed of approximately several-hundreds Kbps and, hence, for viewing the PC-oriented multimedia contents through a portable terminal, there is a need to convert them into multimedia contents with a format or data capacity according to the communication band and capability of a portable terminal.

For example, as a format of the portable-telephone-oriented multimedia contents, there has been known a file format (3GPP MP4) according to the 3GPP TS26.234 V.5.1.0 standard made by carrying out the restraint and expansion on the MPEG-4 File Format (MP4) according to the ISO/IEC14496-1 standard. This file format is made to display/play video (motion picture) media, audio media and text media in one rendering region (display region).

On the other hand, in most cases, the PC-oriented multimedia contents are made through the use of a file format of displaying/playing the motion picture media, audio media and text media in a plurality of rendering regions.

For this reason, there is a need to convert the PC-oriented multimedia contents, file-formatted to display/play the motion picture media, audio media and text media in a plurality of rendering regions, into the portable-terminal-oriented multimedia contents formatted to display/play motion picture media, audio media and text media in one rending area.

Moreover, for the conversion of the PC-oriented multimedia contents into the portable-terminal-oriented multimedia contents, there is a need to carrying out the conversion below a predetermined data capacity for reducing the data capacity as much as possible in order to avoid an increase in communication time or in communication rate.

For example, a possible conversion of the PC-oriented multimedia contents into the portable-terminal-oriented multimedia contents is as follows.

First, of the media constituting the multimedia contents, on the motion picture media occupying a large portion of the capacity, in addition to a reduced conversion of frame rate, bit rate, resolution and others, a content-summarized conversion is made, such as intensively editing only the images of highlight scenes.

Then, in a state where the association between the text media and the motion picture media is placed under control, the editing is made such that the text media and other media are associated with the edited motion picture media in units of segments in which the text media and the motion picture media are associated with each other.

However, in order to reduce the data capacity as much as possible, there is a case in which, as shown in FIG. 15, a portion of the motion picture media is cut in unit smaller than the segment in which the text media and the motion picture media are associated with each other.

In this case, since the association between the text media and the motion picture media to be cut in the unit smaller than the segment is not placed under control, the corresponding text media cannot be automatically associated with the cutting site of the motion picture media.

In addition, since the PC and the portable terminal differ in screen size from each other, for example, the PC-oriented multimedia contents are produced to the size of the PC screen to appear on a screen with a predetermined size, and the portable-terminal-oriented multimedia contents are produced to the size of a screen of the portable terminal to appear on a screen with a size smaller than the predetermined size.

For this reason, in the case of the conversion of the PC-oriented multimedia contents into the portable-terminal-oriented multimedia contents, a particularly important point is that the text media is surely displayed to be readable without impairing the contents of the text media including the semantic contents.

SUMMARY OF THE INVENTION

The present invention has been developed in consideration of these situations, and it is therefore an object of the invention to provide a multimedia contents converting apparatus and method capable of, for example, in the case of the conversion of the PC-oriented multimedia contents into the portable-terminal-oriented multimedia contents, definitely displaying text media and assuring the readability without impairing the contents of text media including semantic contents, and further to provide a multimedia contents conversion program and a computer-readable storage medium storing a multimedia contents conversion program.

For this purpose, in accordance with an aspect of the present invention, there is provided a multimedia contents converting apparatus made to convert input multimedia contents to be displayed on a screen with a predetermined size, including text media and media other than the text media, into output multimedia contents to be displayed on a screen smaller than the predetermined size, the apparatus comprising a text display time calculation processing unit for calculating a display time period of the text media included in the output multimedia contents on the basis of conversion instruction information, a spatiotemporal layout information setting processing unit for setting spatiotemporal layout information on the output multimedia contents on the basis of the conversion instruction information, and a contents conversion processing unit for converting the input multimedia contents into the output multimedia contents on the basis of the spatiotemporal layout information, wherein the spatiotemporal layout information setting processing unit sets a display time period of the text media included in the spatiotemporal layout information on the basis of the display time period of the text media calculated in the text display time calculation processing unit and sets a playing time period of the media other than the text media included in the spatiotemporal layout information on the basis of the display time period of the text media set as the spatiotemporal layout information.

In particular, the multimedia contents converting apparatus according to the present invention is suitable for use in the multimedia contents conversion in a case in which a presentation is constructed through the use of a spatiotemporal combination of single or a plurality of media data.

In this case, "a playing time period of the media other than the text media included in the output multimedia contents is set on the basis of the display time period of the text media set as the spatiotemporal layout information" includes 1) a display time period of a rendering region (effective time period of a rendering region) for the media other than the text media is set to coincide with a display time period of a rendering region (effective time period of a rendering region) for the text media (asynchronous), 2) a display time period of a rendering region (effective time period of a rendering region) for the media other than the text media is set to be shorter than a display time period of a rendering region (effective time period of a rendering region) for the text media (asynchronous), 3) a display time period of a rendering region (effective time period of a rendering region) for the media other than the text media is set to be longer than a display time period of a rendering region (effective time period of a rendering region) for the text media (asynchronous) and 4) a display time period of a segment of the text media is set to coincide with a display time period of a segment of the media other than the text media (in this case, a display time period (effective time period of a rendering region) of the text media coincides with a display time period (effective time period of a rendering region) of the media other than the text media) (synchronous).

Preferably, the text display time calculation processing unit is made to calculate the display time period of the text media included in the output multimedia contents on the basis of text information obtained from the input multimedia contents (for example, the number of characters or letters obtained from the text data included in the input multimedia contents) and text display form information (for example, scroll speed, size of a display region, font type, font size, character spacing) inputted as the conversion instruction information.

Moreover, preferably, the spatiotemporal layout information setting processing unit is made to set the playing time period of the media other than the text media [playing time period of a rendering region (effective time period of a rendering region) for the media other than the text media] included in the spatiotemporal layout information to coincide with a display time period of the text media [display time period of a rendering region (effective time period of a rendering region) for the text media] set as the spatiotemporal layout information.

Still moreover, the multimedia contents converting apparatus further comprises a segment playing time setting unit for setting a playing time period of each of segments of the media other than text media included in the output multimedia contents, a total playing time calculation unit for calculating a total playing time period of all the segments of the media other than the text media on the basis of the playing time period of each of the segments of the media other than the text media set in the segment playing time setting unit, and a repeat count setting processing unit for setting a repeat count (the repeated number of times of playing) of the media other than the text media on the basis of the display time period of the text media calculated in the text display time calculation processing unit and the total playing time period of all the segments of the media other than the text media, and the contents conversion processing unit is made to convert the media other than the text media included in the input multimedia contents on the basis of the repeat count set in the repeat count setting processing unit.

In addition, preferably, the repeat count setting processing unit is made to set, as the repeat count, n (n: integer) which satisfies a condition that, when the repeat count of the media other than the text media is taken as n, the playing time period of the media other than the text media becomes shorter than the display time period of the text media and, when the repeat count of the media other than the text media is taken as n+1, the playing time period of the media other than the text media becomes longer than the display time period of the text media.

Additionally, preferably, the spatiotemporal layout information setting processing unit is made such that, after the completion of n repeated playings, the media other than the text media is frozen until the time of the completion of the display of the text media.

Still additionally, preferably, the multimedia contents converting apparatus further comprises a playing start time setting processing unit for setting a playing start time of a segment of the media other than the text media included in the output multimedia contents on the basis of a playing start time of a segment of the text media included in the input multimedia contents so that the segment of the text media included in the output multimedia contents and the segment of the media other than the text media are displayed in synchronism with each other, and the contents conversion processing unit converts the media other than the text media included in the input multimedia contents on the basis of the playing start time of the media other than the text media set in the playing start time setting processing unit.

Furthermore, in accordance with another aspect of the present invention, there is provided a multimedia contents converting method of converting input multimedia contents to be displayed on a screen with a predetermined size, including text media and media other than the text media, into output multimedia contents to be displayed on a screen smaller than the predetermined size, the method comprising a text display time calculation processing step of calculating a display time period of text media included in the output multimedia contents on the basis of conversion instruction information, a spatiotemporal layout information setting processing step of setting spatiotemporal layout information on the output multimedia contents on the basis of the conversion instruction information, and a contents conversion processing step of converting the input multimedia contents into the output multimedia contents on the basis of the spatiotemporal layout information, and in the spatiotemporal layout information setting processing step, a display time period of the text media included in the spatiotemporal layout information is set on the basis of the display time period of the text media calculated in the text display time calculation processing step and a playing time period of the media other than the text media included in the spatiotemporal layout information is set on the basis of the display time period of the text media set as the spatiotemporal layout information.

In particular, preferably, the multimedia contents converting method includes the processing steps to be conducted in the processing units constituting the foregoing multimedia contents converting apparatus.

Still furthermore, in accordance with a further aspect of the present invention, there is provided a multimedia contents conversion program which makes a computer conduct the processing of converting input multimedia contents to be displayed on a screen with a predetermined size, including text media and media other than the text media, into output multimedia contents to be displayed on a screen smaller than the predetermined size, the conversion processing comprising a text display time calculation processing step of calculating a display time period of text media included in the output multimedia contents on the basis of conversion instruction information, a spatiotemporal layout information setting processing step of setting spatiotemporal layout information on the output multimedia contents on the basis of the conversion instruction information, and a contents conversion processing step of converting the input multimedia contents into the output multimedia contents on the basis of the spatiotemporal layout information, and in the spatiotemporal layout information setting processing step, a display time period of the text media included in the spatiotemporal layout information is set on the basis of the display time period of the text media calculated in the text display time calculation processing step and an item value of a playing time period of the media other than the text media included in the spatiotemporal layout information is set on the basis of the display time period of the text media set as the spatiotemporal layout information.

In particular, preferably, the multimedia contents conversion program makes the computer function as the processing units constituting the foregoing multimedia contents converting apparatus.

Yet furthermore, in accordance with a further aspect of the present invention, there is provided a computer-readable storage medium storing a multimedia contents conversion program which makes a computer conduct the processing of converting input multimedia contents to be displayed on a screen with a predetermined size, including text media and media other than the text media, into output multimedia contents to be displayed on a screen smaller than the predetermined size, the conversion processing comprising a text display time calculation processing step of calculating a display time period of text media included in the output multimedia contents on the basis of conversion instruction information, a spatiotemporal layout information setting processing step of setting spatiotemporal layout information on the output multimedia contents on the basis of the conversion instruction information, and a contents conversion processing step of converting the input multimedia contents into the output multimedia contents on the basis of the spatiotemporal layout information, and in the spatiotemporal layout information setting processing step, a display time period of the text media included in the spatiotemporal layout information is set on the basis of the display time period of the text media calculated in the text display time calculation processing step and a playing time period of the media other than the text media included in the spatiotemporal layout information is set on the basis of the display time period of the text media set as the spatiotemporal layout information.

In particular, preferably, the computer-readable storage medium stores the multimedia contents conversion program which makes the computer function as the processing units constituting the foregoing multimedia contents converting apparatus.

In addition, in accordance with a further aspect of the present invention, there is provided a multimedia contents converting apparatus comprising a control unit for conducting the processing of converting input multimedia contents to be displayed on a screen with a predetermined size, including text media and media other than the text media, into output multimedia contents to be displayed on a screen smaller than the predetermined size on the basis of conversion instruction information and a storage unit for storing a spatiotemporal layout information table, wherein the control unit conducts the processing including a step of acquiring information (for example, address information) on predetermined text media from the input multimedia contents on the basis of the conversion instruction information and reading out the spatiotemporal layout information table from the storage unit to temporarily produce a spatiotemporal layout information table by setting the information on the predetermined text media, a step of acquiring data of the predetermined text data from the input multimedia contents through the use of the information on the predetermined text media set in the spatiotemporal layout information table, a step of calculating a display time period of text media included in the output multimedia contents on the basis of the data of the predetermined text media, setting a display time period of the text media in the spatiotemporal layout information table on the basis of the calculated display time period of the text media and setting a playing time period of the media other than the text media included in the output multimedia contents in the spatiotemporal layout information table on the basis of the display time period of the text data set in the spatiotemporal layout information table to bring the spatiotemporal layout information table to completion, and a step of converting the input multimedia contents into the output multimedia contents on the basis of the spatiotemporal layout information table brought to completion.

Thus, with the multimedia contents converting apparatus, multimedia contents converting method, multimedia contents conversion program and computer-readable storage medium storing a multimedia contents conversion program according to the present invention, for example, in a case in which the PC-oriented multimedia contents are converted into the portable-terminal-oriented multimedia contents, there is an advantage in that the text media can surely be displayed and the conversion can automatically be made to assure the readability without impairing the contents of the text media including semantic information.

BRIEF DESCRIPTION OF THE DRAWINGS

FIG. 4 is an illustration of an arrangement of program data of input multimedia contents to be converted by the multimedia contents converting apparatus according to the embodiment of the present invention;

FIGS. 5(A) to 5(I) are views showing time arrangements of input multimedia contents to be converted by the multimedia contents converting apparatus according to the embodiment of the present invention;

FIGS. 7(A) to 7(H) are illustrations of conversion instruction information to be inputted to the multimedia contents converting apparatus according to the embodiment of the present invention;

FIGS. 8(A) to 8(F) are illustrations of a spatiotemporal information table obtained by analyzing the input multimedia contents (see FIG. 4) to be converted by the multimedia contents converting apparatus according to the embodiment of the present invention;

FIGS. 9(A) and 9(B) are illustrations of a spatiotemporal layout information table and a segment information table in a case in which the conversion is made according to an asynchronous conversion method in the multimedia contents converting apparatus according to the embodiment of the present invention;

FIGS. 10(A) and 10(B) are illustrations of a spatiotemporal layout information table and a segment information table in a case in which the conversion is made according to a synchronous conversion method in the multimedia contents converting apparatus according to the embodiment of the present invention;

DESCRIPTION OF THE PREFERRED EMBODIMENTS

An embodiment of the present invention will be described hereinbelow with reference to the drawings.

Referring to FIGS. 1 to 14, a description will be given hereinbelow of a multimedia contents converting apparatus, a multimedia contents converting method, and a multimedia contents conversion program (computer-readable storage medium storing a multimedia contents conversion program) according to this embodiment.

Figure 2:
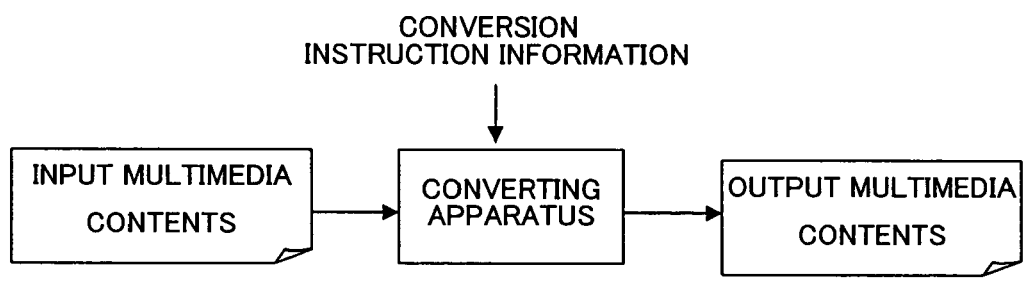
FIG. 2 is a view useful for explaining the outline of the multimedia contents converting apparatus according to the embodiment of the present invention.

As FIG. 2 shows, this multimedia contents converting apparatus is designed to convert input multimedia contents [including text media and other media such as audio media and video media (motion picture media, moving picture media) other than the text media; for example, PC-oriented contents], to be displayed on a screen with a predetermined size, into output multimedia contents [for example, contents oriented to portable terminal such as a portable telephone or a PDA (Personal Digital Assistants); contents below a predetermined data capacity], to be displayed on a screen smaller than the predetermined size, on the basis of conversion instruction information (for example, inputted from the external through an input unit such as a keyboard or a mouse).

In this embodiment, since difficulty is experienced in automatically making content-summarized editing on text media including semantic information unlike motion picture media, the content of a text before the conversion is intact put in output multimedia contents after the conversion without being edited.

However, since a portable terminal such as a portable telephone has a screen smaller than that of a PC, even if the same-content texts are displayed, there is a need to devise the display, such as scrolling or the like.

For example, in a case in which many characters are included as text media, although it is considered that the text media is displayed with the scroll speed being made high, since the display time period of the text media becomes short in this case, there is a possibility that the user cannot read it within a time.

In addition, for example, a further possible approach is to decrease the size of characters or letters constituting the text media. However, this approach degrades the readability.

Still additionally, even if as mentioned above the text media scroll is made at a higher speed and the characters organizing the text media are made with a smaller size, it is not always possible to display all the characters of the text media.

For this reason, in this embodiment, the playing time period of the media (for example, edited motion picture media) other than the text media is set in consideration of the display time period of the text media included in the output multimedia contents.

Figure 3A:
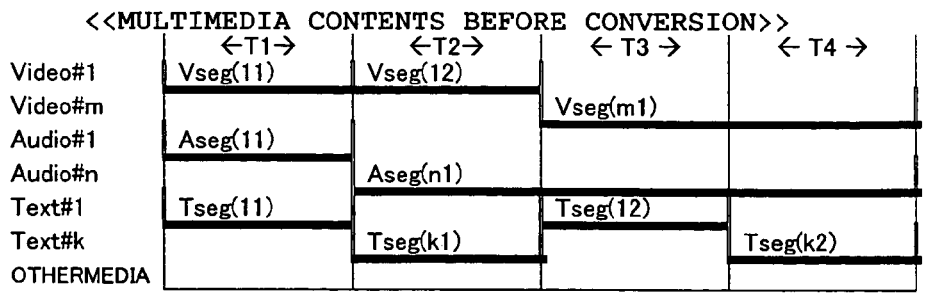
FIGS. 3(A) to 3(D) are illustrations of time arrangements of multimedia contents before the conversion by the multimedia contents converting apparatus according to the embodiment of the present invention and multimedia contents after the conversion made thereby.
Figure 3B:
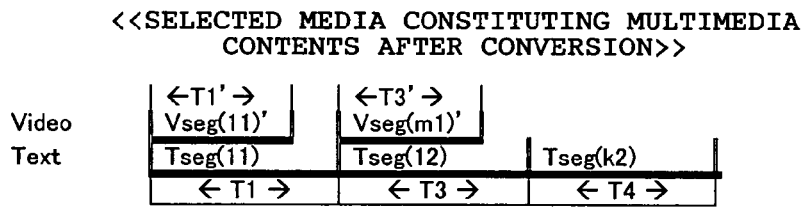

Concretely, this multimedia contents converting apparatus is designed to make a conversion of input multimedia contents (multimedia contents before conversion) including video media (motion picture media), audio media and text media and, for example, having a presentation arrangement shown in FIG. 3(A) into output multimedia contents (multimedia contents after conversion) including video media and text media and, for example, having a presentation arrangement shown in FIG. 3(B).

The input multimedia contents (for example, PC-oriented contents) are arranged to have a plurality of (two in this case) rendering regions for each media, for example, as shown in FIG. 3(A).

That is, as shown in FIG. 3(A), in a first video rendering region (Video#1) a segment Vseg(11) of the video media is displayed for a time period (T1 time period) indicated by a reference character T1 and a segment Vseg(12) of the video media is displayed for a time period (T2 time period) indicated by a reference character T2, and in an m-th video rendering region (Video#m) a segment Vseg(m1) of the video media is displayed for a timer period (T3+T4 time period) designated at reference characters T3 and T4.

Moreover, in a first audio rendering region (Audio#1) a segment Aseg(11) of the video media is played for the time period (T1 time period) indicated by a reference character T1, and in an n-th audio rendering region (Audio#n) a segment Aseg(n1) of the audio media is played for a time period (T2+T3+T4 time period) designated at reference characters T2, T3 and T4.

Still moreover, in a first text rendering region (Text#1) a segment Tseg(11) of the text media is displayed for the time period (T1 time period) designated at reference character T1 and a segment Tseg(12) of the text media is then displayed for the time period (T3 time period) indicated by reference character T3 after the elapse of the time period (T2 time period) designated at reference character T2, and in a k-th text rendering region (Text #k), after the elapse of the time period (T1 time period) designated at reference character T1, a segment Tseg(k1) of the text media is displayed for the time period (T2 time period) designated at reference character T2 and, after the elapse of the time period (T3 time period) designated at reference character T3, a segment Tseg(k2) of the text media is displayed for the time period (T4 time period) designated at reference character T4.

On the other hand, the output multimedia contents (for example, portable-terminal-oriented contents below a predetermined data capacity) is arranged to have one rendering region for each media, for example, as shown in FIG. 3(B).

That is, as shown in FIG. 3(B), in a text rendering region (Text) a segment Tseg(11) of the text media is displayed for the time period (T1 time period) designated at reference character T1, a segment Tseg(12) of the text media is then displayed for the time period (T3 time period) designated at reference character T3, and a segment Tseg (k2) of the text media is further displayed for the time period (T4 time period) designated at reference character T4. Also in the case of the conversion into the portable-terminal-oriented multimedia contents below a predetermined data capacity, the display time period of the text media remains unchanged.

Moreover, in a video rendering region (Video), a segment Vseg(11)' of the video media is displayed for a time period (T1' time period) designated at reference character T1' in synchronism with the display of the segment Tseg(11) of the text media, and a segment Vseg(m1)' of the video media is displayed for a time period (T3' time period) designated at reference character T3' in synchronism with the display of the segment Tseg(12) of the text media.

In this case, the conversion is made such that the playing time period of the video media (media other than the text media) becomes shorter than the display time period of the text media. That is, the conversion is made such that the playing time period of each of the segments of the video media (media other than the text media) becomes shorter than the playing time period of each of the segment of the corresponding text media.

Figure 3C:
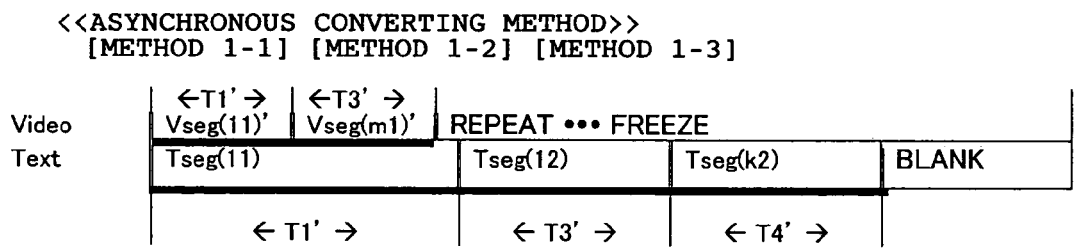
Figure 3D:
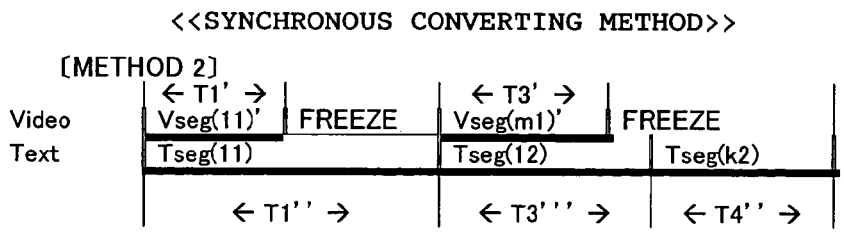

Although the above description has been made on the premise that the display time period of the text media does not vary even if the PC-oriented contents are converted into the portable-terminal-oriented contents, in fact, since the PC and the portable terminal (particularly, portable telephone) have different screens (display regions) in size, when the PC-oriented contents are converted into the portable-terminal-oriented contents, the display time period of the text media becomes usually longer [see FIG. 3(D)].

Moreover, although the segments of the video media are displayed in synchronism with the segments of the text media when the PC-oriented contents are converted into the portable-terminal-oriented contents (which converting method is referred to as a synchronous converting method, the present invention is not limited to this, but it is also appropriate that, for example, regardless of the display of the segments of the text media (asynchronous), the segments of the video media are continuously displayed (this converting is referred to as an asynchronous converting method) [see FIG. 3(C)].

As described above, since the multimedia contents converting apparatus according to this embodiment is made to make a conversion into multimedia contents having a presentation arrangement considering the display time period of the text media, even in a case in which many characters are included in the text media constituting the multimedia contents and, when converted, the display time period of the text media becomes longer than the playing time period of the motion picture media (video media), the conversion is automatically achievable to surely display the text media and assure the readability of the text media without impairing the contents of the text media including the semantic information.

In addition, this multimedia contents converting apparatus is used for converting the PC (for example, desktop personal computer, notebook personal computer, or the like) oriented contents into the portable terminal (for example, portable telephone or PDA) oriented contents and, in particular, it is effective in converting contents having an important point in displaying the text media.

Figure 1:
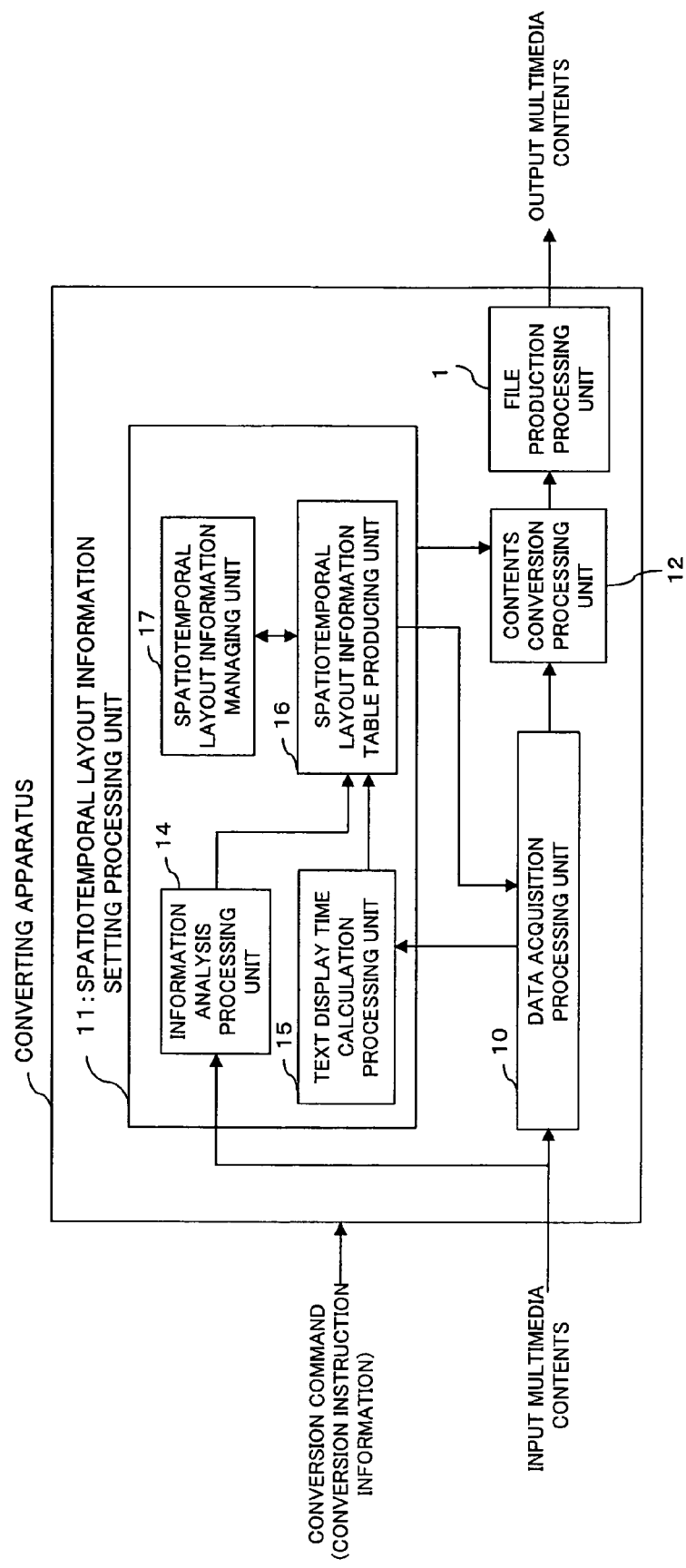
FIG. 1 is a functional block diagram showing the entire configuration of a multimedia contents converting apparatus according to an embodiment of the present invention.

Referring to FIG. 1, a detailed description will be given hereinbelow of a configuration of this multimedia contents converting apparatus.

This multimedia contents converting apparatus is made up of an input unit (for example, a keyboard, a mouse or the like), a display (display unit) serving as an output unit, a control unit (control arithmetic unit, computer), for example, including a CPU, a memory and others, and a storage unit such as a ROM or a hard disk. For example, when multimedia contents are downloaded in a personal computer, the personal computer can be used as a multimedia contents converting apparatus.

The storage unit stores, in addition to an operating system (which hereinafter will be referred to equally as an "OS") and various application programs, a multimedia contents conversion program which makes a computer realize the functions which will be described later, and these programs are loaded on a memory of the control unit and executed by the CPU, thereby realizing desired functions.

In particular, when the control unit carries out the multimedia contents conversion program on the basis of a conversion command (including conversion instruction information), for example, as shown in the functional block diagram of FIG. 1, there are realized a data acquisition processing function (data acquisition processing unit 10) for acquiring arbitrary media data [all of or a portion of media data (arbitrary time zone)] from the input multimedia contents, a spatiotemporal layout information setting processing function (spatiotemporal layout information setting processing unit 11) for setting spatiotemporal layout information on the output multimedia contents on the basis of the conversion instruction information, a conversion processing function (contents conversion processing unit 12) for making a conversion of each media data included in the input multimedia contents for each media data according to a spatiotemporal layout information table, and a file production processing function (file production processing unit 13) for producing an output multimedia contents file by combining the converted media data.

In this configuration, the data acquisition processing unit 10 includes a text data acquisition processing function (text data acquisition processing unit) for acquiring data of arbitrary text media [all or a portion (arbitrary time zone) of data of text media] from the input multimedia contents, an audio data acquisition processing function (audio data acquisition processing unit) for acquiring data of arbitrary audio media [all or a portion (arbitrary time zone) of data of audio media] from the input multimedia contents, and a video data (motion picture data) acquisition processing function [video data (motion picture data) acquisition processing unit] for acquiring data of arbitrary video media (motion picture media) [all or a portion (arbitrary time zone) of data (motion picture data) of video media] from the input multimedia contents.

For example, in a case in which the input multimedia contents shown in FIG. 3(A) is converted into the output multimedia contents shown in FIG. 3(B), the data acquisition processing unit 10 acquires the overall time zone (T1 zone) of the segment Vseg (11) of the video media, the T3 zone of the segment Vseg(m1) thereof, the overall time zone (T1 zone) of the segment Tseg(11) of the text media, the overall time zone (T3 zone) of the segment Tseg(12) thereof, and the overall time zone (T4 zone) of the segment Tseg(k2) thereof from the video media, the audio media and the text media constituting the input multimedia contents.

The spatiotemporal layout information setting processing unit 11 includes an information analysis processing function (information analysis processing unit 14) for analyzing the input multimedia contents to acquire spatiotemporal information including, for example, time information, time period information and address information indicative of locations of data for producing a spatiotemporal information table, a text display time calculation processing function (text display time calculation processing unit 15) for calculating a display time period of the text media, included in the output multimedia contents, on the basis of the conversion instruction information, a spatiotemporal layout information table producing function (spatiotemporal layout information table producing unit 16) for producing a spatiotemporal layout information table, a spatiotemporal layout information managing function (spatiotemporal layout information managing unit 17) for storing and managing the spatiotemporal layout information table produced in the spatiotemporal layout information table producing unit 16.

In this configuration, if the input multimedia contents are described through the use of a language such as SMIL, the information analysis processing unit 14 obtains a synchronous time and connection time of each media with respect to other media and address information indicative of the locations of data from information on media playing sequence control or media playing synchronization control in the presentation descriptions, thereby producing a spatiotemporal information table including spatiotemporal information such as time information, time period information, address information indicative of the locations of data on the basis of the aforesaid synchronous time and connection time and address information indicative of the locations of data. This is equally referred to as a synchronous information analysis processing unit, for that the information on the playing sequence (order) control or the playing synchronization control is analyzed to obtain the synchronous time and the connection time.

The text display time calculation processing unit 15 is made to calculate a display time period of a segment of the text media included in the output multimedia contents, on the basis of, for example, the number of characters (text information) obtained from the text media data included in the input multimedia contents and a scroll speed, display region size, font type, font size and character spacing (text display form information; attribute information on text telop).

Moreover, the text display time calculation processing unit 15 has a further function to calculate a display time period of the text media (total display time period of all the segments of the text media; effective time period of a rendering region) on the basis of the display time period of each segment of the text media.

The spatiotemporal layout information table producing unit 16 is made to set an item value(s) in a spatiotemporal layout information table and a segment information table associated therewith (the information included in these tables is referred to as spatiotemporal layout information) on the basis of the spatiotemporal information table produced in the information analysis processing unit 14, the text data display time period calculated in the text display time calculation processing unit 15 and the conversion instruction information. Incidentally, the spatiotemporal layout information table producing unit 16 additionally carries out the various calculations needed for the setting of the item value.

In this connection, a plurality of spatiotemporal layout information tables (templates) and a plurality of segment information tables (templates) are prepared for each conversion method such as a synchronous converting method or an asynchronous converting method and stored in a storage unit (for example, hard disk) and, when the multimedia contents conversion program is placed into execution, they are read out from the storage unit (for example, hard disk) and managed in the spatiotemporal layout information managing unit 17 (for example, memory).

The contents conversion processing unit 12 includes a text data conversion processing function (text data conversion processing unit) for, on the basis of the display time period of the text media calculated in the text display time calculation processing unit 15 and the conversion instruction information, fetching the text media data from the data acquisition processing unit 10 to conduct the conversion processing, an audio data conversion processing function (audio data conversion processing unit) for, on the basis of the playing time period of the audio media set in the playing time setting processing unit and the conversion instruction information, fetching the audio media data from the data acquisition processing unit 10 to conduct the conversion processing, and a video data (motion picture data) conversion processing function [video data (motion picture data) conversion processing unit] for, on the basis of the playing time of the video media set in the playing time setting processing unit and the conversion instruction information, fetching the video media data from the data acquisition processing unit 10 to conduct the conversion processing.

In this configuration, for example, the text data conversion processing unit is made to bring in the text media data from the data acquisition processing unit 10 to produce text telop data on the basis of the spatiotemporal layout information table managed in the spatiotemporal layout information managing unit 17. For this reason, it is equally referred to as a telop data production processing unit.

In addition, for example, the audio data conversion processing unit is made to bring in the audio media data from the data acquisition processing unit 10 to produce coded audio data, designated in an encoding condition included in the conversion instruction information, on the basis of the spatiotemporal layout information table managed in the spatiotemporal layout information managing unit 17.

Still additionally, for example, the video data conversion processing unit (motion picture data conversion processing unit) is made to convert the video media (motion picture media), fetched from the data acquisition processing unit 10, into coded video media (motion picture media), designated in an encoding condition included in the conversion instruction information, on the basis of the spatiotemporal layout information table managed in the spatiotemporal layout information managing unit 17. For example, the video data conversion processing unit may be constructed to include a decoder of an MPEG-4 Video and a resolution converter.

The file production processing unit 13 combines media, produced in the contents conversion processing unit 12, on the basis of output file format information and output presentation form information included in the conversion instruction information to produce (compound) an output multimedia contents file of a type in which presentation construction information is dependent on a file format.

Secondly, as an example, a description will be given hereinbelow of a case in which multimedia contents (see FIG. 4) produced with SMIL (Synchronized Multimedia Integration Language) for integrating an independent multimedia object into a synchronized multimedia presentation is converted according to a different encoding method for each media data to provide multimedia contents of file type standardized according to 3GPP 26.234 V.5.1.0.

In FIG. 4, <par> represents control information (synchronous control information) intended to play media data of a child node in a synchronized condition, and <seq> denotes control information (sequence control information) intended to play the media data of the child node in sequence.

For example, in the case of the multimedia contents arranged as shown in FIG. 4, from 0 to 10 seconds (0 s to 10 s) on the time line of the presentation, on the basis of the description indicated by circled numeral 1 in FIG. 4, a portion (vseg1) from 10 s to 20 s in v1.mpg, a portion (aseg1) from 40 s to 50 s of a1.mpg and tx1.html(tseg1) are fetched as shown in FIGS. 5(A), 5(D) and 5(F), with these being displayed/played in a synchronized condition.

Moreover, from 10 to 20 seconds (10 s to 20 s) on the time line of the presentation, on the basis of the description indicated by circled numeral 2 in FIG. 4, a portion (vseg2) from 0 s to 10 s and tx2.html(tseg2) are fetched as shown in FIGS. 5(B) and 5(G), with these being displayed in a synchronized condition.

Still moreover, from 20 to 40 seconds (20 s to 40 s) on the time line of the presentation, on the basis of the description indicated by circled numeral 3 in FIG. 4, a portion (vseg3) from 20 s to 40 s in v3.mpg, tx3.html(tseg3) and tx4.html1 (tseg4) are fetched in sequence as shown in FIGS. 5(C), 5(H) and 5(I), with these being displayed in a synchronized condition.

Yet moreover, from 10 to 40 seconds (10 s to 40 s) on the time line of the presentation, on the basis of the description indicated by circled numeral 4 in FIG. 4, a portion (aseg2) of a2.mpg is fetched as shown in FIG. 5(E), and is played in synchronism with the aforesaid 0 s-10 s portion (vseg2) of v2.mpg, tx2.html1, 20 s-40 s portion(vseg3) of v3.mpg, tx3.html1(tseg3) and tx4.html1(tseg4).

Referring to a flow chart of FIG. 6, a description will be given hereinbelow of the conversion processing to be implemented in this multimedia contents converting apparatus.

In response to the start-up of the multimedia contents conversion program and the input of a conversion command (including conversion instruction information) through the input unit of the multimedia contents converting apparatus, the processing in the steps S10 and S20 take place. Incidentally, the processing in the steps S10 and S20 can be conducted in no fixed sequence.

In this case, for example, the conversion instruction information given by the instruction from the external includes "output file format information" shown in FIG. 7(A), "output presentation form information" shown in FIG. 7(B), "rendering region transition information (spatiotemporal layout information #1)" shown in FIGS. 7(C) and 7(D), "rendering region information" shown in FIG. 7(E), "motion picture display form information" shown in FIG. 7(F), "text display form information" shown in FIG. 7(G), and "scroll information" shown in FIG. 7(H).

The "output file format information" indicates 3GPP TS.26.234 V.5.1.0 as an output file format type as shown in FIG. 7(A).

The "output presentation form information" indicates which of an asynchronous converting method "method 1" and a synchronous converting method "method 2" is employed as an output presentation form and which of "methods "1-1", "1-2" and "1-3" of the asynchronous converting method is taken, as shown in FIG. 7(B).

The "rendering region transition information indicates a transition sequence for each identifier (rendering region ID) specifying a rendering region, as rendering region transition information as shown in FIGS. 7(C) and 7(D).

The "rendering region information" includes, for each rendering region ID, as shown in FIG. 7(E), information such as media assortment (kind) (for example, motion picture, text, audio, or the like) to be displayed/played in that area, display position [for example, in the case of a rectangle, the upper-left coordinates; (0, 0), (−12, 144), or the like], display region (for example, in the case of a rectangle, (176×144), (200×10) designated by a width and a height], and media display form (for example, motion picture display form information, text display form information).

In this case, the "motion picture display form information" includes at least an encoding method (for example, MPEG-4 Video SP@L0), a frame rate (for example, up to 15 fps) and a bit rate (for example, up to 64 kbps) as shown in FIG. 7(F).

The "text display form information" includes at least an encoding method (for example, 3GPP Timed Text), a font name (for example, Serif) to be used, a font size (for example, 9 pt), a character spacing (for example, 1 pt), a font pitch (for example, fixed) and ornament information (for example, information on scroll; scroll information) as shown in FIG. 7(G).

The "scroll information" includes, for example, vertical directions, horizontal directions and the like as scroll directions and a scroll speed such as 30 pixel/sec as shown in FIG. 7(H).

Figure 6:
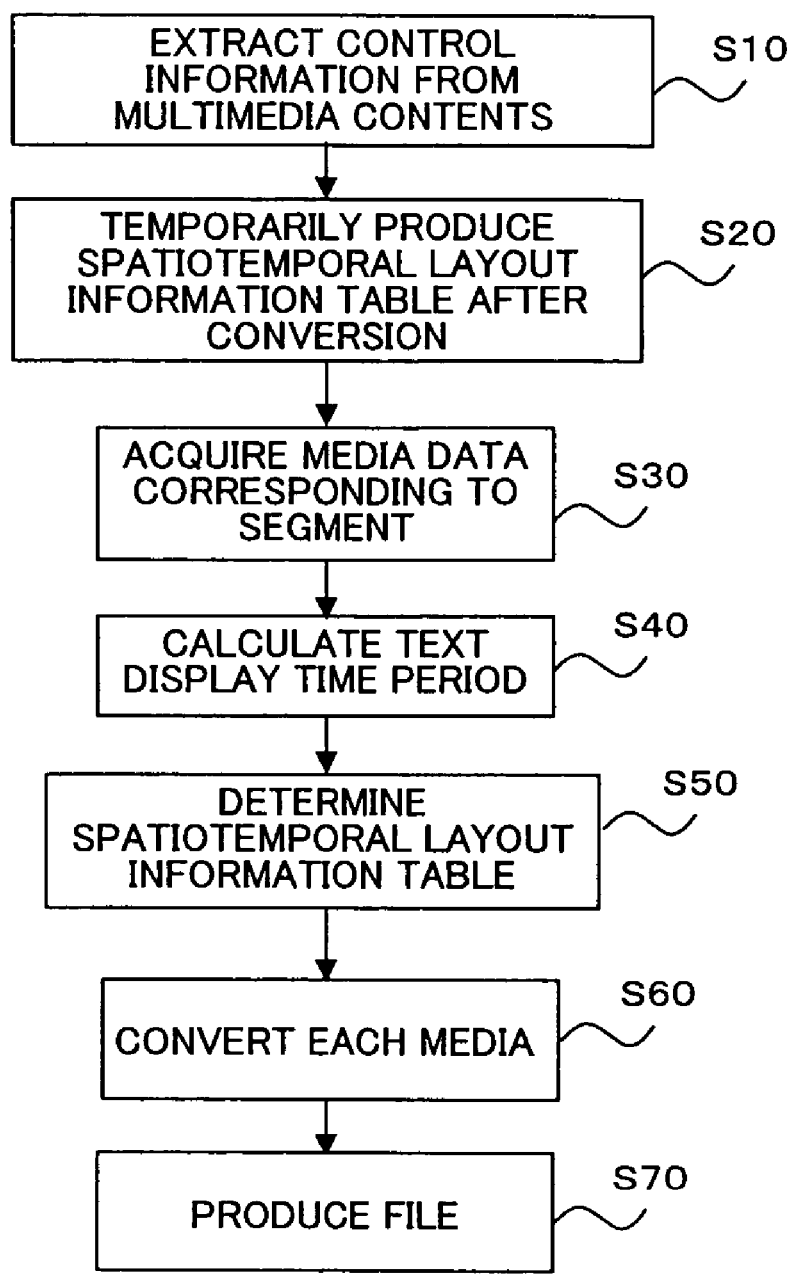
FIG. 6 is a flow chart showing the processing to be implemented by the multimedia contents converting apparatus according to the embodiment of the present invention.

First, in the step S10 of FIG. 6, for each rendering region (display area), the information analysis processing unit (synchronous information analysis processing unit) 14 acquires information on each media data to be played in each time zone on the time line of the presentation from the multimedia contents produced through the use of SMIL as shown in FIG. 4 [in particular, control information (synchronous control information, sequence control information) included in the presentation description of the multimedia contents], thereby producing spatiotemporal information tables shown in FIGS. 8(A) to 8(F).

Concretely, the multimedia contents produced through the use of SMIL as shown in FIG. 4 are converted through a conversion program, the spatiotemporal information tables are obtained as shown in FIGS. 8(A) to 8 (F).

Incidentally, the information on each media data is connection time or synchronous time of the media data acquired from the synchronous control information or the sequence control information for the synchronization of an independent multimedia object in SMIL and, hence, it is equally referred to as synchronous information.

Starting from the left column in the spatiotemporal information tables shown in FIGS. 8(A) to 8 (F), the information on each media data includes at least the playing start time and playing time period of the time line of the presentation (these times are obtained from the start time and end time on the time line of the media data included in the input multimedia contents), address information (URL) indicative of the location of the entity of the media data, and the start time and end time on the time line of the media data.

For example, in the case of the multimedia contents produced through the use of SMIL as shown in FIG. 4, from the portion indicated by circled numeral 1 in FIG. 4, there are acquired the information that the playing start time of the time line of the presentation is 0 s, the playing time period thereof is 10 s, the address information indicative of the location of the entity of the video data is v1.mpg, the start time of the time line of the media data is 10 s and the end time thereof is 20 s, thereby producing the uppermost row in the spatiotemporal information table shown in FIG. 8(A). The other rows of the spatiotemporal information table shown in FIG. 8(A) and the respective rows of the spatiotemporal information tables shown in FIGS. 8(B) to 8(F) are produced in like manner.

Following this, in the step S20, the spatiotemporal layout information table producing unit 16 temporarily produces a spatiotemporal layout information table for multimedia contents after conversion on the basis of the conversion instruction information.

Figure 12:
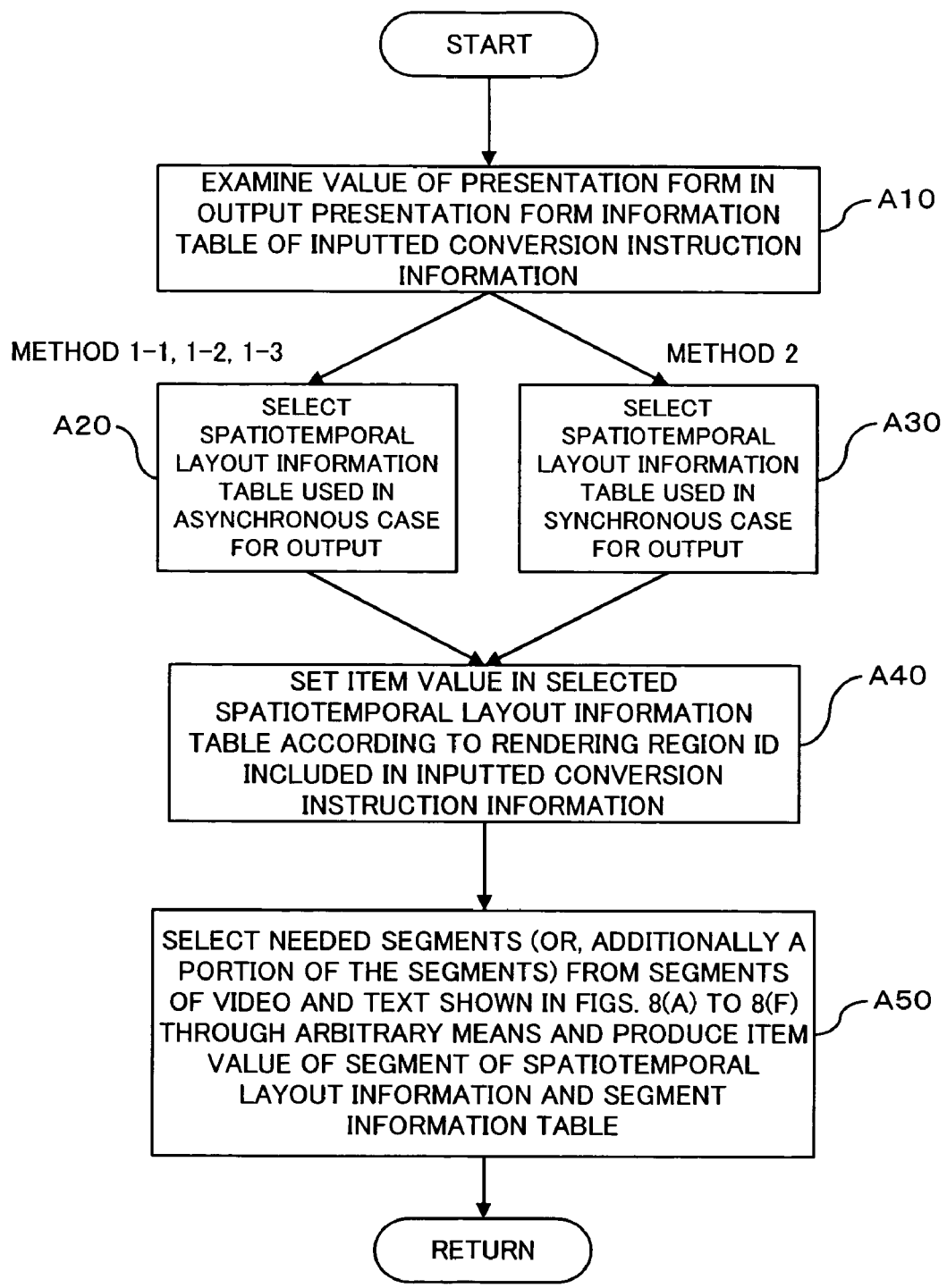
FIG. 12 is a flow chart showing the processing to be implemented by the multimedia contents converting apparatus according to the embodiment of the present invention.

Referring to a flowchart of FIG. 12, a description will be given hereinbelow of the temporary production of the spatiotemporal layout information table.

First, in a step A10, the spatiotemporal layout information table producing unit 16 refers to the item values of a "presentation form" of the "output presentation form information" included in the conversion instruction information. That is, the spatiotemporal layout information table producing unit 16 makes a decision as to whether the item value of the "presentation form" indicates the "method 1" (asynchronous) or the "method 2" (synchronous).

If the decision shows that the item value of the "presentation form" indicates the "method 1" (asynchronous), the operational flow advances to a step A20 where the spatiotemporal layout information table producing unit 16 reads out the asynchronous spatiotemporal layout information table and segment information table [see FIGS. 9(A) and 9(B)] from the spatiotemporal layout information managing unit 17. In this case, the tables to be read out are templates blanked in item value.

As shown in FIG. 9(A), the spatiotemporal layout information table to be used in the asynchronous case is managed for each rendering region, and it includes a rendering region ID (for example, VRegionID1, TRegionID1), an assortment of media (media assortment; for example, motion picture, text) to be displayed/played, a sequence set (Vseg#1 . . . Vseg#s, Tseg#1 . . . Tseg#t) of segment IDs of the media data to be played, a playing start time (for example, 0; display start time of a rendering region) of the time line of the presentation, a playing time period [for example, TMP, DurOf (Tseg#1 . . . Tseg#t); a playing time period (effective time period) of a rendering region], effect instruction information (for example, in a case in which media data are different in playing time period from each other, an effect to be created, that is, display/play to be made, within the remaining time after the completion of the display/play of media data whose playing time period is short), and others.

In particular, the "segment ID" of a segment to be displayed in the relevant rendering region is set as the item value of the "segment" of the spatiotemporal layout information table, and the information on the segment specified by this "segment ID" is managed in the "segment information table" [see FIG. 9(B)] associated through the "segment ID" with the spatiotemporal layout information table.

Moreover, as shown in FIG. 9(B), the segment information table in the asynchronous case includes at least a segment ID (for example, Vseg#1 . . . Vseg#s, Tseg#1 . . . Tseg#t), an assortment of media (media assortment; motion picture, text) to be displayed/played, a segment playing time period [V#1_ed-v#1_st . . . v#s_ed-v#s_st, DurOf (Tseg#1) . . . DurOf (Tseg#t), address information (for example, URL; URLv1 . . . URLvs, URLt1 . . . URLts) indicative of the location of media data, a start time (v#1_st . . . v#1_ed) of the time line of the media data and an end time (v#s-st . . . V#s_ed) thereof.

On the other hand, if the decision shows that the item value of the "presentation form" indicates the "method 2" (synchronous), the operational flow advances to a step A30 where the spatiotemporal layout information table producing unit 16 reads out the synchronous spatiotemporal layout information table and segment information table [see FIGS. 10(A) and 10(B)] from the spatiotemporal layout information managing unit 17. The tables to be read out are templates blanked in item value.

As shown in FIG. 10(A), the synchronous spatiotemporal layout information table to be used in the synchronous case is managed for each rendering region, and it includes a rendering region ID (for example, VRegionID1, TRegionID1), an assortment of media (media assortment; for example, motion picture, text) to be displayed/played, a sequence set (Vseg#1 . . . Vseg#s, Tseg#1 . . . Tseg#t) of segment IDs of the media data to be played, a playing start time (for example, 0; display start time of a rendering region) of the time line of the presentation, a playing time period [for example, DurOf (Vseg#1 . . . Vseg#s), DurOf (Tseg#1 . . . Tseg#s); a playing time period (effective time period) of a rendering region], and others.

In particular, the "segment ID" of a segment to be display in the relevant rendering region is set as the item value of the "segment" of the spatiotemporal layout information table, and the information on the segment specified by this "segment ID" is managed in the "segment information table" [see FIG. 10(B)] associated through the "segment ID" with the spatiotemporal layout information table.

Moreover, as shown in FIG. 10(B), the segment information table in the synchronous case includes at least a segment ID (for example, Vseg#1 . . . Vseg#s, Tseg#1 . . . Tseg#s), an assortment of media (media assortment; motion picture, text) to be displayed/played, a segment playing time period [Max (DurOf (Tseg#1), (V#1_ed-v#1_st)) . . . Max(DurOf (Tseg#s), (v#s_ed-v#s_st)); Max (x, y)], effect instruction information (for example, in a case in which segments of media data are different in playing time period from each other, an effect to be created, that is, display/play to be made, within the remaining time after the completion of the display/play of the segments of media data whose playing time period is short), address information (for example, URL; URLv1 . . . URLvs, URLt1 . . . URLts) indicative of the location of media data, a start time (v#1_st . . . v#1_ed) of the time line of the media data and an end time (v#s_st . . . v#s_ed) thereof, and others.

After the spatiotemporal layout information table and the segment information table are read out through any route in this way, in a step A40 the spatiotemporal layout information table producing unit 16 sees the "rendering region ID" of the "rendering region transition sequence information (spatiotemporal layout information #1)" included in the conversion instruction information and the item value set in the "display media assortment" of the "rendering region information" to set the "rendering region ID" of the spatiotemporal layout information table (spatiotemporal layout information #2) and the item value of the "media assortment". In this connection, the item value of the "playing time period" in the spatiotemporal layout information table is set at 0 in advance.

As the item value of the "effect instruction information" in the spatiotemporal layout information table [see FIG. 9(A)] for use in the asynchronous case, the "repeated" (signifying an instruction whereby the media is repeatedly played times designated) is set in a rendering region (video rendering region; VregionID1) in which the "video" is set as the item value of the "media assortment", and the "freeze" (signifying an instruction whereby the state at the completion of the playing continues; for example, a scroll instruction whereby the blank state continues, an instruction whereby a stay state is maintained) is set in a rendering region (text rendering region; TRegionID1) in which the "text" is set as the item value of the "media assortment".

In this connection, it is also appropriate that "N/A" (No Assign; an instruction of blanking, or erasing of rendering region) is set in the rendering region of the "text".

On the other hand, as the item value of the "effect instruction information" in the segment information table [see FIG. 10(B)] for use in the synchronous case, the "freeze" (or "repeated") is set in a rendering region (video rendering region; VRegionID1) in which the "video" is set as the item value of the "media assortment", and the "N/A" (or the "freeze") is set in a rendering region (text rendering region; TRegionID1) in which the "text" is set as the item value of the "media assortment".

Following this, in a step A50, predetermined item values of the spatiotemporal layout information table and the segment information table are set through the use of the spatiotemporal information table produced by the information analysis processing unit 14.

Referring to a flowchart of FIG. 13, a description will be given hereinbelow of the setting of predetermined item values in the spatiotemporal layout information table and the segment information table in the case of the readout of the asynchronous spatiotemporal layout information table.

First, in a step B10, when, of the media data constituting the input multimedia contents, a segment (or a portion thereof) of the media to be included in the output multimedia contents is selected (that is, a selection command is inputted), the spatiotemporal layout information table producing unit 16 sets the segment ID of the selected segment as the item value of the "segment" in the spatiotemporal layout information table and sets the segment ID of the selected segment and the media assortment as the item values of the "segment ID" and the "media assortment" in the segment information table [see FIGS. 9(A) and 9(B)]

Moreover, the spatiotemporal layout information table producing unit 16 reads out the start time and end time of the selected segment, the address information indicative of the location of the data, and others from the spatiotemporal information table [see FIGS. 8(A) to 8(F)] produced by the information analysis processing unit 14, and sets them as the "start time", "end time" and "data location" in the segment information table.

In this case, with respect to the segment corresponding to the segment ID (Vseg#1), "v#1_st" is set as the item value of the "start time", "v#1_ed" is set as the item value of the "end time", and "URLv1" is set as the item value of the "data location". Moreover, with respect to the segment corresponding to the segment ID (Vseg#s), "v#s_st" is set as the item value of the "start time", "v#s_ed" is set as the item value of the "end time", and "URLvs" is set as the item value of the "data location". Still moreover, with respect to the segment corresponding to the segment ID (Tseg#1), "URLt1" is set as the item value of the "data location", and with respect to the segment corresponding to the segment ID (Tseg#t), "URLts" is set as the item value of the "data location".

The selection of the segment can arbitrarily be made by referring to the spatiotemporal information tables [see FIGS. 8(A) to 8 (F)], and an operator can also input it.

Furthermore, in a step B20, the spatiotemporal layout information table producing unit 16 sets a difference value between the "end time" and the "start time" as the item value of the "playing time period" of the segment in which the "video" is set as the item value of the "media assortment" in the segment information table.

In this case, with respect to the segment corresponding to the segment ID (Vseg#1), since "v#1_st" is set as the item value of the "start time" and "v#1_ed" is set as the item value of the "end time", "v#1_ed-v#1_st" is set as the item value of the "playing time period". Moreover, with respect to the segment of the segment ID (Vseg#s), since "v#s_st" is set as the item value of the "start time" and "v#s_ed" is set as the item value of the "end time", "v#s_ed-v#s_st" is set as the item value of the "playing time period".

Subsequently, in a step B30, when a display time period of a segment of the text media is calculated afterwards, the spatiotemporal layout information table producing unit 16 sets a notation DurOf( ) indicative of the calculated value being set, as the item value of the "playing time period" (playing end time of the segment of the text media) of the segment in which the "text" is set as the item value of the "media assortment" in the segment information table.

In this case, with respect to the segment of the segment ID (Tseg#1), "DurOf (Tseg#1)" is set as the item value of the "playing time period", and with respect to the segment of the segment ID (Tseg#t), "DurOf (Tseg#t)" is set as the item value of the "playing time period".

In addition, the spatiotemporal layout information table producing unit 16 sets the notation TMP indicative of the setting being made afterwards, as the item value of the "playing time period" (motion picture media playing time period on the time line of the presentation; an effective time period of the rendering region) of the rendering region (video rendering region; VRegionID1) in which the "video" is set as the item value of the "media assortment" in the spatiotemporal layout information table.

In this connection, in the TMP, a time (that is, a playing end time of a motion picture media) to be taken in consideration of the repeated playing of all the segments of the motion picture media is set afterwards.

Still additionally, when a total playing time period (time period covering the effect; that is, text playing end time) of all the segments (Tseg#1 . . . Tesg#t) set as the item values of the "segment" is calculated afterwards, the spatiotemporal layout information table producing unit 16 sets the notation DurOf( ) indicative of the calculated value being set afterwards, as the item value of the "playing time period" (text media playing time period on the time line of the presentation; an effective time period of the rendering region) of the rendering region (text rendering region; TRegionID1) in which the "text" is set as the item value of the "media assortment" in the spatiotemporal layout information table.

In this way, a feature of the spatiotemporal layout information table for use in the asynchronous case is that a variable TMP is set in a field of the playing time period on the time line of the presentation of the motion picture media and the "repeated" is set in the "effect instruction information".

Figure 14:
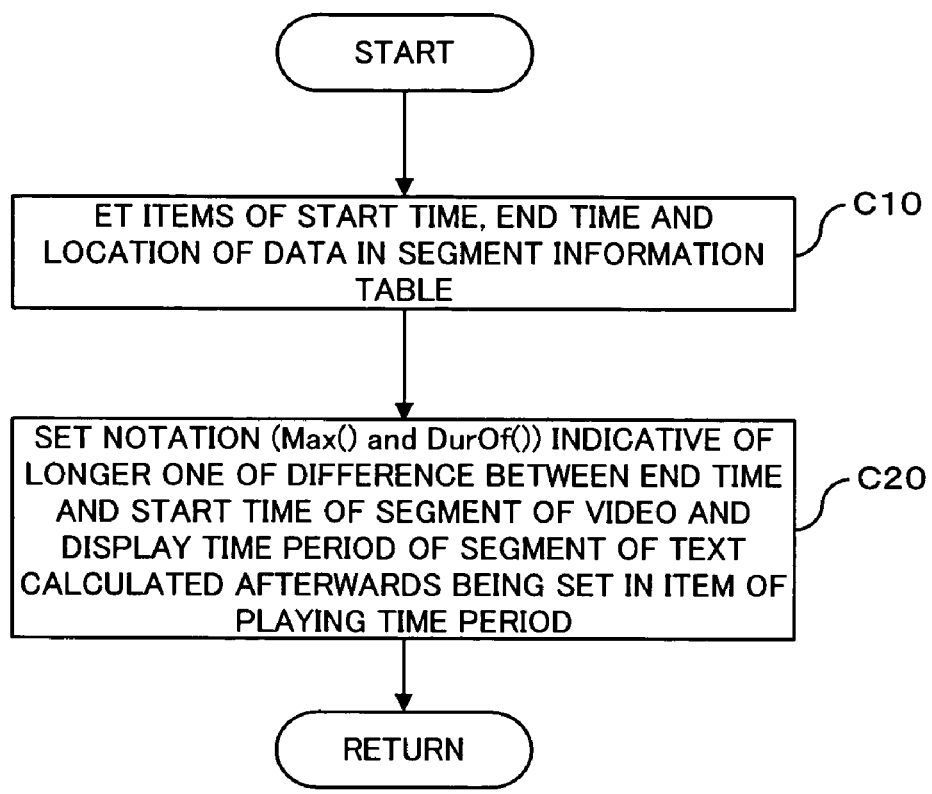
FIG. 14 is a flow chart showing the processing to be implemented by the multimedia contents converting apparatus according to the embodiment of the present invention.
Figure 15:
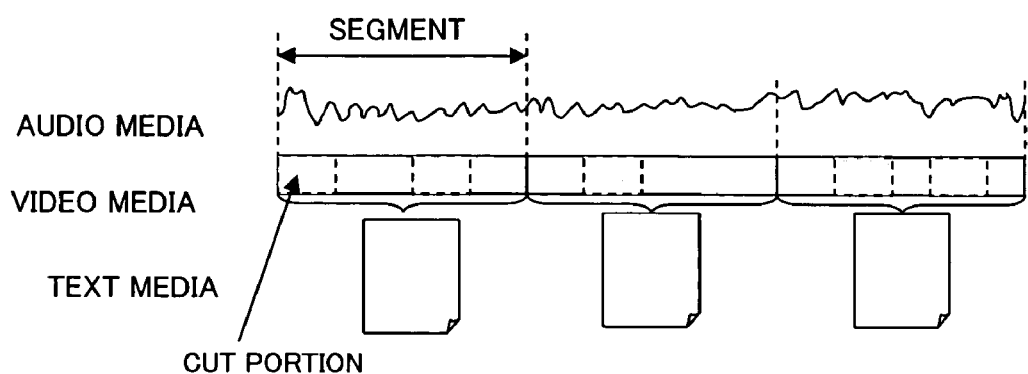
FIG. 15 is an illustration for explaining problems in a case in which the conversion of multimedia contents is made according to a common method.

Furthermore, referring to a flow chart of FIG. 14, a description will be given hereinbelow of the setting of predetermined item values in a spatiotemporal layout information table and a segment information table in the case of the readout of the spatiotemporal layout information table in the synchronous case [see FIG. 10(A)].

Figure 13:
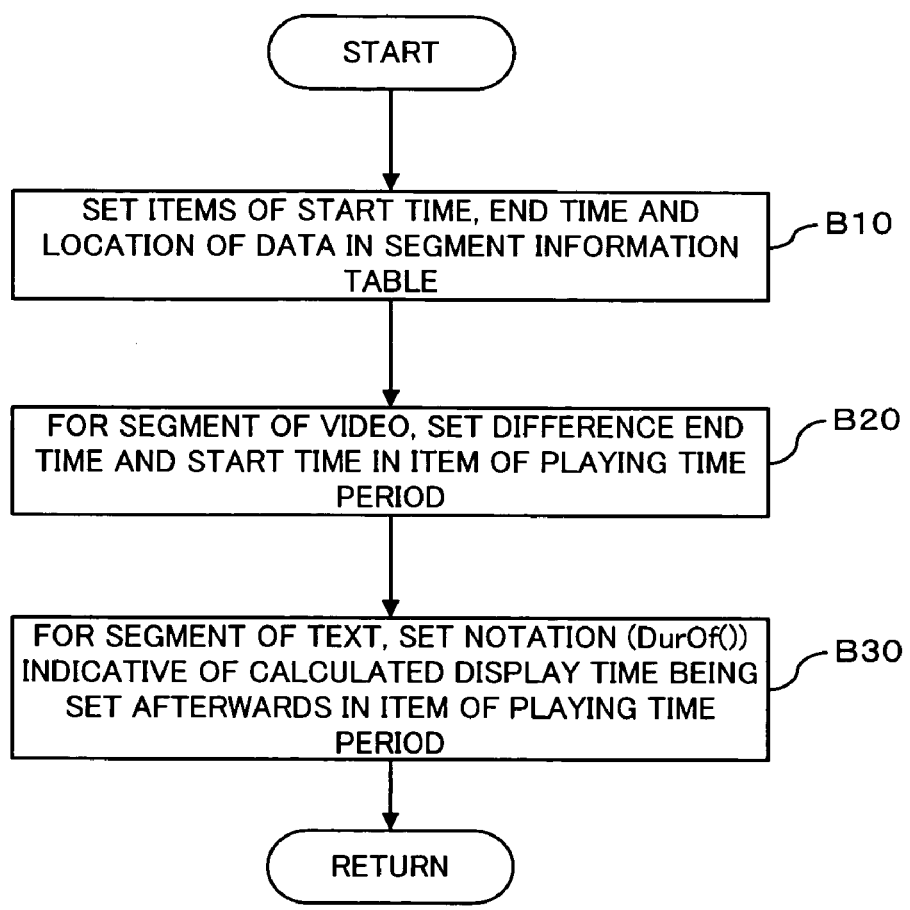
FIG. 13 is a flow chart showing the processing to be implemented by the multimedia contents converting apparatus according to the embodiment of the present invention.

First, the processing in a step C10 is conducted which is like the aforesaid case of the readout of the spatiotemporal layout information table in the asynchronous case (see the step B10 in FIG. 13).

Subsequently, in a step C20, the spatiotemporal layout information table producing unit 16 sets Max (x, y) indicative of the larger one of a difference value x between the "end time" and the "start time" and a value y of a display time period of the segment of the text media to be calculated afterwards being set afterwards, as an item value of the "playing time period" (that is, the motion picture media playing end time) of the segment in which the "video" is set as the item value of the "media assortment" in the segment information table.

In this case, for the segment of the segment ID (Vseg#1), "Max(DurOf (Tseg#1), (v#1_ed-v#1_st)" is set as the item value of the "playing time period". Moreover, for the segment of the segment ID (Vseg#s) "Max(DurOf (Tseg#s), (v#s_ed-v#s_st)" is set as the item value of the "playing time period".

In addition, the spatiotemporal layout information table producing unit 16 sets Max (x, y) so that the same value as a value set as the item value of the "playing time period" of the segment of the "video" to be synchronously played is set as the item value of the "playing time period" (that is, the text media playing end time) of the segment in which the "text" is set as the item value of the "media assortment" in the segment information table.

In this case, for the segment of the segment ID (Tseg#1), "Max(DurOf (Tseg#1), (v#1_ed-v#1_st)" is set as the item value of the "playing time period". Moreover, for the segment of the segment ID (Tseg#s) "Max(DurOf (Tseg#s) (v#s_ed-v#s_st)" is set as the item value of the "playing time period".

Still additionally, when a total playing time period (time period covering the effect; that is, the text playing end time) of all the segments (Vseg#1 . . . Vseg#s) set as the item values of the "segment" is calculated afterwards, the spatiotemporal layout information table producing unit 16 sets a notation DurOf (Vseg#1 . . . Vseg#s) indicative of the calculated value being set, as the item value of the "playing time period" (motion picture media playing time period on the time line of the presentation; an effective time period of a rendering region) of a rendering region (video rendering region; VRegionID1) in which the "video" is set as the item value of the "media assortment" in the spatiotemporal layout information table.

Yet additionally, when a total playing time period (time period covering the effect; that is, the text playing end time) of all the segments (Tseg#1 . . . Tseg#s) set as the item values of the "segment" is calculated afterwards, the spatiotemporal layout information table producing unit 16 sets a notation DurOf (Tseg#1 . . . Tseg#s) indicative of the calculated value being set, as the item value of the "playing time period" (text media playing time period on the time line of the presentation; an effective time period of a rendering region) of a rendering region (text rendering region; TRegionID1) in which the "text" is set as the item value of the "media assortment" in the spatiotemporal layout information table.

In this way, a feature of the item value of the playing time period of the segment in the segment information table for use in the synchronous case is that the description of Max(x, y) is made so that the larger one of the playing time period of the segment of the motion picture data and the playing time period of the segment of the text data displayed in synchronism therewith is set, and the "freeze" is set in the "effect instruction information" of the motion picture.

In this connection, the spatiotemporal layout information table (spatiotemporal layout information #2) is produced by expanding the rendering region transition sequence information (spatiotemporal layout information #1).

After the production of the spatiotemporal layout information table in this way, in a step S30 of FIG. 6, the data acquisition processing unit 10 acquires media data to be included in the output multimedia contents from the media data included in the input multimedia contents for each segment through the use of the spatiotemporal layout information table produced in the step S20.

That is, the video data acquisition processing unit acquires video data to be included in the output multimedia contents from the video data included in the input multimedia contents for each segment through the use of the spatiotemporal layout information table (particularly, address information), and the audio data acquisition processing unit acquires audio data to be included in the output multimedia contents from the audio data included in the input multimedia contents for each segment through the use of the spatiotemporal layout information table (particularly, address information), and the text data acquisition processing unit acquires text data to be included in the output multimedia contents from the text data included in the input multimedia contents for each segment through the use of the spatiotemporal layout information table (particularly, address information).

Incidentally, it is also appropriate to acquire all the segments constituting the media data included in the input multimedia contents, or to acquire a portion thereof.

Thereafter, in a step S40, the text display time calculation processing unit 15 calculates a display time period of the text data included in the output multimedia contents in the case of covering the text data included in the input multimedia contents on the basis of the conversion instruction information (that is, through the use of the spatiotemporal layout information table.

First, the text display time calculation processing unit 15 reads out the text data included in the input multimedia contents from the text data acquisition processing unit to calculate the number of characters of the text data (text information), and calculates a display time period of the segment of the text data included in the after-conversion multimedia contents (output multimedia contents) on the basis of the number of characters of the text data and the text display form information (for example, scroll speed, size of a display region, font type, font size, character spacing) inputted as the conversion instruction information.

Figure 11:
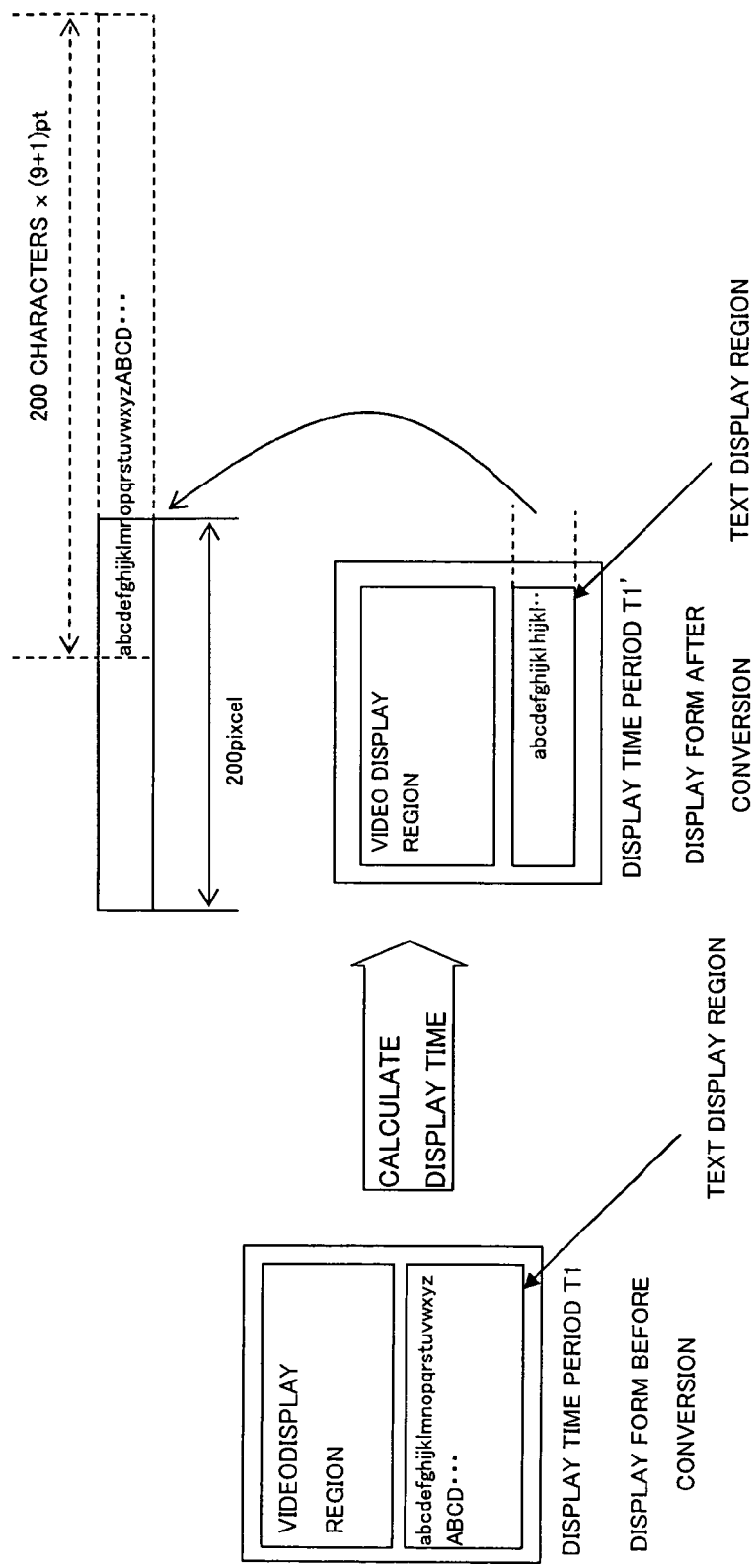
FIG. 11 is a view useful for explaining the processing in a text display time calculation processing unit of the conversion is made according to an asynchronous conversion method in the multimedia contents converting apparatus according to the embodiment of the present invention.

For example, as FIG. 11 shows, in a case in which the number of characters included in the segment of the text media to be displayed in the text display region (text rendering region) of the before-conversion input multimedia contents is 200, the display region (text telop display region) of the after-conversion output multimedia contents is 200×10 pixel, the pitch is fixed, the font size is 9 pt, the character spacing is 1 pt, the scroll directions are right- and left-hand directions, the scroll speed is 40 pixel/sec, the scroll-in is from the right side of the text display region and the scroll-out is from the left side thereof, the display time period of the text media is calculated as 55 seconds according to the following equation.

$$\{200\times(9+1)+200\}/40=55 \text{ sec.}$$

Following this, in a step S50, the spatiotemporal layout information table producing unit 16 sets a non-set item value in the spatiotemporal layout information table through the use of the display time period of the segment of the text data calculated by the text display time calculation processing unit 15 in the step S40, thereby completing the spatiotemporal layout information table for the output multimedia contents.

In particular, in this embodiment, the spatiotemporal layout information table producing unit 16 sets an item value of the display time period of the text media in the spatiotemporal layout information table on the basis of the display time of the text media calculated by the text display time calculation processing unit 15, and sets an item value of the playing time period of the media other than the text media in the spatiotemporal layout information table on the basis of the item value of the display time period of the text media in the spatiotemporal layout information table.

The spatiotemporal layout information table produced in this way is stored and managed in the spatiotemporal layout information managing unit 17.

A detailed description will be given hereinbelow of (1) a case in which the "method 1" (asynchronous) is indicated as the output presentation form and (2) a case in which the "method 2" (synchronous) is indicated as the output presentation form.

(1) Case of the "method 1" (asynchronous) Being Indicated as Output Presentation Form The spatiotemporal layout information table producing unit 16 sets the display time period (text media display time period) of the segment of the text media, calculated by the text display time calculation processing unit 15 in the step S40, in the playing time period [DurOf(Tseg#1) . . . DurOf(Tseg#t); DurOf(Tseg#n)] of the segment of the text media in the segment information table [see FIG. 9(B)].

Moreover, the spatiotemporal layout information table producing unit 16 calculates a total display time period of all the segments through the use of the display time period of each of the segments of the text media calculated by the text display time calculation processing unit 15 in the step S40, and sets the calculated total display time period (text media display time period) in the playing time period DurOf (Tseg#1 . . . Tseg#t) of the text media in the spatiotemporal layout information table [see FIG. 9(A)].

Still moreover, the spatiotemporal layout information table producing unit 16 sets a playing time period of media other than the text media included in the output multimedia contents, on the basis of the display time period (that is, the display time period of each segment of the text media or the total display time period of the entire text media) of the text media set in the spatiotemporal layout information table (this function is referred to as a playing time setting processing unit).

Therefore, the spatiotemporal layout information table producing unit 16 includes a function (segment playing time period setting unit) which sets a playing time period of a segment of media (in this case, video media) other than the text media included in the output multimedia contents, a function (total playing time calculating unit) which calculates a total playing time period of all the segments (which establish a repeated basic unit) of the media other than the text media on the basis of a playing time period of each segment of the media other than the text media set in the segment playing time setting unit, and a function (repeat count setting processing unit) which sets the repeat count (the repeated number of times of playing) of the media other than the text media on the basis of the display time period of the text media calculated in the text display time calculation processing unit 15.

In this embodiment, as mentioned below, the playing time period TMP of the motion picture media in the spatiotemporal layout information table is set so that, for example, as shown in FIG. 3(C), the segment of the text media included in the output multimedia contents and the segment of the media (in this case, video media) other than the text media are displayed in an asynchronous condition.

1) Case of the "method 1-1" Being Indicated

The spatiotemporal layout information table producing unit 16 sets the same value as the value set in the playing time period DurOf (Tseg#1 . . . Tseg#t) of the text media in the spatiotemporal layout information table, in the playing time period TMP of the motion picture media in the spatiotemporal layout information table [see FIG. 9(A)]. That is, the spatiotemporal layout information table producing unit (playing time period setting processing unit) 16 sets the item value of the playing time period of the motion picture media in the spatiotemporal layout information table so that it agrees with (equals) the item value of the display time period of the text media in the spatiotemporal layout information table.

In this case, since the "effect instruction information" of the media (in this case, video media) other than the text media in the spatiotemporal layout information table is set as "repeated" [see FIG. 9(A)], all the segments constituting the other media (in this case, video media) are repeatedly played. However, since the playing time period (effective time period of a rendering region) of the media other than the text media set by the spatiotemporal layout information table producing unit (playing time setting processing unit) 16 is the same as the display time period (effective time period of a rendering region) of the text media, the display of the other media (in this case, video media) comes to an end at the completion of the display of the text media.

In this connection, it is also appropriate that the repeat count is set at n like the "method 1-2". In this case, the spatiotemporal layout information table producing unit 16 additionally sets the "freeze" in the "effect instruction information" of the media other than the text media in the spatiotemporal layout information table so that the rendering region of the media other than the text media is frozen after the completion of n repeated playings. When the "freeze" is set in the "effect instruction information" in this way, for example, in the case of the video media, a still picture of the last frame of the video media is displayed until the display end time of the text media.

2) Case of the "method 1-2" Being Indicated

The spatiotemporal layout information table producing unit (playing time setting processing unit) 16 calculates an integer value n of [DurOf (Tseg#1 . . . Tseg#t)/(v#s_ed-v#1_st)] when a value set in the playing time period DurOf (Tseg#1 . . . Tseg#t) of the text media in the spatiotemporal layout information table is divided by a value (v#s_ed-v#1_st) obtained by subtracting the last segment start time v#1_st of the video media from the end time v#s_ed of the first segment of the video media set in the segment information table, and sets a value calculated according to an equation (v#s_ed-v#1_st)×n in the playing time period TMP of the motion picture media in the spatiotemporal layout information table [see FIG. 9(A)].

In this case, the aforesaid repeat count setting processing unit is made to, as the repeat count, n (n: integer) satisfying the condition that, in a case in which the repeat count of the media (in this case, video media) other than the text media is set at n, the playing time period of the media other than the text media becomes shorter than the display time period of the text media, and when the repeat count of the media other than the text media is set at n+1, the playing time period of the media other than the text media becomes longer than the display time period of the text media.

Moreover, in this case, the "effect instruction information" of the media (in this case, video media) other than the text media in the spatiotemporal layout information table is "repeated" [see FIG. 9(A)], the repeat count is set at n in the repeat count setting processing unit, and the value calculated according to (v#s_ed-v#1_st)×n is set as the playing time period (effective time period of a rendering region) of the media other than the text media set by the spatiotemporal layout information table producing unit (playing time setting processing unit) 16.

Therefore, the playing time period thereof becomes shorter than the display time period(effective time period of a rendering region) of the text media and all the segments constituting the media (in this case, video media) other than the text media are repeatedly played n times, and at the end of the playing time period (effective time of a rendering region; (v#s_ed-v#1_st)×n; repeated playing time period; repeat time) of the other media (in this case, video media), the display region (rendering region) of the other media (in this case, video media) is erased. Incidentally, the display region (rendering region) of the text media is erased after this.

3) Case of the "method 1-3" Being Indicated

In the case of the "method 1-2", the spatiotemporal layout information table producing unit 16 calculates an integer value n of [DurOf (Tseg#1 . . . Tseg#t)/(v#s_ed-v#1_st] and sets a value calculated according to an equation (v#s_ed-v#1_st)×(n+1) in the playing time period TMP of the motion picture media in the spatiotemporal layout information table [see FIG. 9(A)].

In this case, the aforesaid repeat count setting processing unit is made to, as the repeat count, n+1 (n: integer) satisfying the condition that, in a case in which the repeat count of the media other than the text media is set at n, the playing time period of the media other than becomes shorter than the display time period of the text media, and when the repeat count of the media other than the text media is set at n+1, the playing time period of the media other than the text media becomes longer than the display time period of the text media.

Moreover, in this case, the "effect instruction information" of the media (in this case, video media) other than the text media in the spatiotemporal layout information table is "repeated" [see FIG. 9(A)], the repeat count is set at n+1 in the repeat count setting processing unit, and the value calculated according to (v#s_ed-v#1_st)×(n+1) is set as the playing time period (effective time period of a rendering region) of the media other than the text media set by the spatiotemporal layout information table producing unit (playing time setting processing unit) 16.

Therefore, the playing time period thereof becomes longer than the display time period (effective time period of a rendering region) of the text media and all the segments constituting the media (in this case, video media) other than the text media are repeatedly played n times, and at the end of the playing time period (effective time of a rendering region; (v#s_ed-v#1_st)×(n+1); repeated playing time period) of the other media (in this case, video media) the display region (rendering region) of the other media (in this case, video media) is erased. Incidentally, the display region (rendering region) of the text media is erased before this.

(2) Case of the "method 2" (synchronous) Being Indicated as Output Presentation Form The spatiotemporal layout information table producing unit 16 makes a comparison between DurOf (Tseg#1) . . . DurOf (Tseg#t) calculated by the text display time calculation processing unit 15 in the step S40 and set as the item value of the display time period of the segment of the text media in the spatiotemporal layout information table and the playing time period [value (v#1_ed-v#1_st) . . . (v#s_ed-v#s_st) obtained by subtracting the start time v#1_st . . . v#s_st of the segment of the video media from the end time v#1_ed . . . v#s_ed of the segment of the video media set in the segment information table] of the segment of the video media related thereto to set the larger one in the playing time period Max(x, y) of the segment of the text media and the video media in the segment information table [see FIG. 10(B)].

That is, the spatiotemporal layout information table producing unit 16 sets the playing time period Max(x, y) of the segment of the text media in the segment information table and the playing time period Max (x, y) of the segment of the video media in the segment information table to the same value.

In this case, the spatiotemporal layout information table producing unit 16 sets the item value of the playing time period (playing time period of the video media) of the segment of the media other than the text media in the segment information table to agree with the item value of the display time period (display time period of the text media) of the segment of the text media in the segment information table, thereby regenerating the segment of the text media and the segment of the video media in synchronism with each other.

This enables the segment Tseg(11), Tseg(12) of the text media included in the output multimedia contents and the segment Vseg(11)', Vseg(m1)' of the media (in this case, video media) other than the text media to be displayed in a synchronous condition, for example, as shown in FIG. 3(D).

In this case, since the playing time period of the segment of the media (in this case, video media) other than the text media included in the output multimedia contents when the conversion of the media (in this case, video media) other than the text media included in the input multimedia contents is made on the basis of the conversion instruction information becomes shorter than the display time period of the segment of the text media included in the output multimedia contents, the playing is frozen at the end of each segment of the other media (in this case, video media) according to the "freeze" set as the item value of the "effect instruction information" in the segment information table as shown in FIG. 3(D).

Incidentally, setting the same value in the playing time period Max(x, y) of the segment of the text media in the segment information table and the playing time period Max (x, y) of the segment of the video media in the segment information table signifies that the playing start time of the segment of the media other than the text media included in the output multimedia contents is set to coincide with the playing start time of the segment of the text media included in the output multimedia contents.

In this case, the spatiotemporal layout information table producing unit 16 is made to include a function (playing start time setting processing unit) to set the playing start time of the segment of the media other than the text media included in the output multimedia contents, on the basis of the playing start time of the segment of the text media included in the output multimedia contents.

Moreover, the spatiotemporal layout information table producing unit 16 adds up all of the values set as the playing time periods of the segments of the text media in the segment information templates as mentioned above (the larger ones of the display time periods of the segments of the text media and the playing time periods of the segments of the video media synchronized therewith; Max (x, y)) to calculate a total display time period of the segments of the text media, and sets the calculated total display time period in the playing time period DurOf (Tseg#1 . . . Tseg#s) of the text data in the spatiotemporal layout information template [see FIG. 10(A)].

Still moreover, as mentioned above, all of the values set as the playing time periods of the segments of the video media in the segment information template (the larger ones of the display time periods of the segments of the text media and the playing time periods of the segments of the video media synchronized therewith; Max (x, y)) are added up to calculate a total display time period of the segments of the video media, and sets the calculated total display time period in the playing time period DurOf (Vseg#1 ... Vseg#s) of the video media in the spatiotemporal layout information template [see FIG. 10(A)].

In this case, the playing time period of the text media in the spatiotemporal layout information template becomes equal to the playing time period of the video media.

Although the above description relates to the text media display time period and the video media playing time period, like manner is employable with respect to the display time period (playing time period) of the other media.

Following this, in a step S60, the contents conversion processing unit 12 fetches the media data from the data acquisition processing unit 10 to conduct the conversion (media conversion) processing.

That is, for example, the text data conversion processing unit brings in the text data from the text data acquisition processing unit and implements the conversion (text conversion) on the basis of the spatiotemporal layout information table produced in the aforesaid step S50 and managed in the spatiotemporal layout information managing unit 17 and the conversion instruction information to produce text media constituting the output multimedia contents (in this case, producing text telop data).

Therefore, the text data conversion processing unit is designed to include a telop producing device (for example, Timed Text type telop producing device) which produces text telop data according to an encoding method (for example, 3GPP Timed Text) designated through the conversion instruction information.

The video data conversion processing unit (motion picture conversion processing unit) fetches, for example, the video data from the video data acquisition processing unit to once convert it into an original image through the use of a decoder of an input data encoding type, and then makes the conversion (motion picture conversion under a re-encoding condition) on the basis of the spatiotemporal layout information table produced in the aforesaid step S50 and managed in the spatiotemporal layout information managing unit 17 and the conversion instruction information, thereby producing the video media organizing the output multimedia contents.

Therefore, the video data conversion processing unit includes a motion picture converter (for example, MPEG-4 Video SP@L0 encoder) which makes a conversion of the original image data into motion picture data according to an encoding method (for example, MPEG-4 Video SP@L0) designated through the through the conversion instruction information.

The audio data conversion processing unit fetches, for example, the audio data from the audio data acquisition processing unit to once convert it into the original audio data through the use of an input data encoding type decoder, and then makes the conversion (audio conversion under a re-encoding condition) thereof on the basis of the spatiotemporal layout information table produced in the aforesaid step S50 and managed in the spatiotemporal layout information managing unit 17 and the conversion instruction information to produce the audio data organizing the output multimedia contents.

Therefore, the audio data conversion processing unit includes a converter (for example, GSM-AMR encoder) which converts the original audio data into the audio data according to an encoding method (for example, GSM-AMR) designated through the conversion instruction information.

Thereafter, in a step S70, the file production processing unit 13 produces the output multimedia contents according to a designated file format on the basis of the spatiotemporal layout information table (concretely, the conversion instruction information related thereto) produced in the aforesaid step S50 and managed in the spatiotemporal layout information managing unit 17.

Therefore, the file production processing unit 13 includes, for example, a 3GPP TS 26.234. V.5.10 type filing device.

Accordingly, with the multimedia contents converting apparatus and method according to this embodiment, in a case in which, for example, the PC-oriented multimedia contents are converted in the portable-terminal-oriented multimedia contents, there are advantages in that the text media is surely displayed without impairing the contents of the text media including the semantic information and the conversion is automatically made so as to ensure the readability. This can considerably lessen the burden of the laborious contents production work.

In particular, for example, if the multimedia contents conversion program is mounted in a portable terminal such as a portable telephone and is executed through a control unit thereof, in a case in which the PC-oriented multimedia contents are converted into the portable-terminal-oriented multimedia contents while being downloaded and the "repeated" is set in the "effect instruction information" included in the spatiotemporal layout information, since the segment forming a repeated basic unit is already downloaded in a memory of the portable terminal for the repeated playing of the other media (in this case, video media) the repeated playing is feasible with this segment. In this case, there is no need to download new data for the repeated playing, which leads to requiring no time and no communication cost, so this is preferable.

Incidentally, for reducing the multimedia contents data capacity to the utmost, since it is effective to reduce the data capacity of the media such as video media or audio media other than the text media to the utmost, although in this embodiment the conversion is made so that the playing time period of each segment of the video media (media other than the text media) becomes shorter than the playing time period of each segment of the corresponding text media, the present invention is not limited to this.

That is, if the input multimedia contents to be displayed on a screen with a predetermined size can be converted into the output multimedia contents to be displayed on a screen having a size smaller than the predetermined size, it is acceptable that the playing time period of each segment of the video media (media other than the text media) is made longer than the playing time period of each segment of the corresponding text media. Moreover, in the case of the asynchronous converting method, it is also acceptable that the display time period of the other media (effective time period of the rendering region) becomes longer than the display time period of the text media (effective time period of the rendering region).

Accordingly, in a case in which the result of a comparison made between the display time period of the text media and the playing time period of the media (in this case, video media) other than the text media shows that the playing time period of the media other than the text media is longer than the display time period of the text media, the effect instruction information which has been used at the end of the other media may be used as the effect instruction information of the text media.

Meanwhile, although the above-described embodiment relates to the multimedia contents converting apparatus, a program (multimedia contents conversion program) for realizing this multimedia contents converting apparatus can be stored in a computer-readable recording (storage) medium and can be distributed to be put on the market for selling and buying in a state stored in the recording medium.

Moreover, when the multimedia contents conversion program stored in the recording medium is installed in a computer (for example, a personal computer or a portable terminal), the computer (for example, a personal computer or a portable terminal) can execute this program to realize the multimedia contents converting apparatus described above in this embodiment. Therefore, effects similar to the effects of the above-described multimedia contents converting apparatus are obtainable through the use of the multimedia contents conversion program stored in the recording medium.

In this case, the recording medium includes a program storing device, such as a semiconductor memory, a magnetic disk, an optical disk (for example, CD-ROM and the like), a magneto optical disk (MO), a magnetic tape, a hard disk, a flexible disk, an IC card, a ROM cartridge, a punch card, a storage unit (RAM, ROM, and the like) in the interior of a computer or an external storage unit. Moreover, it is also possible to use various computer-readable mediums such as a printed matter on which codes such as bar code are printed.

Although in this case the multimedia contents conversion program is stored in a computer-readable recording medium, the storage thereof in the recording medium is not always required. Moreover, the multimedia contents conversion program can also be transmitted (transmitted/received) through, for example, a network (communication network) serving as a transmission medium without being stored in the recording medium as mentioned above. This enables the multimedia contents conversion program to be distributed to be put on the market for selling and buying. For example, it is also possible to upload the multimedia contents conversion program in a web server or the like, or to download it from the web server or the like through a network such as the internet.

It should be understood that the present invention is not limited to the above-described embodiment, and that it is intended to cover all changes and modifications of the embodiment of the invention herein which do not constitute departures from the spirit and scope of the invention.

What is claimed is:

1. A multimedia contents converting apparatus, comprising:
   a text display time calculation processing unit being configured to calculate an adjusted display time period of text media to be included in output multimedia contents on the basis of conversion instruction information;
   a spatiotemporal layout information setting processing unit being configured to set spatiotemporal layout information on said output multimedia contents on the basis of said conversion instruction information; and
   a contents conversion processing unit being configured to convert input multimedia contents, including text media and media other than the text media, oriented to a personal computer to be displayed on a screen of the personal computer with a predetermined size into said output multimedia contents oriented to portable terminal to be displayed on a screen of the portable terminal with a size smaller than said predetermined size on the basis of said spatiotemporal layout information,
   wherein said spatiotemporal layout information setting processing unit is configured to set a display time period of said text media included in said spatiotemporal layout information, on the basis of said display time period of said text media calculated in said text display time calculation processing unit, and modify and synchronize a playing time period of said media other than said text media included in said spatiotemporal layout information, responsive to said display time period of said text media set as said spatiotemporal layout information.

2. A multimedia contents converting apparatus according to claim 1, wherein said text display time setting calculation processing unit calculates said display time period of said text media to be included in said output multimedia contents, on the basis of text information obtained from said input multimedia contents and text display form information inputted as said conversion instruction information.

3. A multimedia contents converting apparatus according to claim 1, wherein said spatiotemporal layout information setting processing unit sets a playing time period of said media other than said text media included in said spatiotemporal layout information to coincide with said display time period of said text media set as said spatiotemporal layout information.

4. A multimedia contents converting apparatus according to claim 1, further comprising:
   a segment playing time setting unit for setting, modifying, and synchronizing a playing time period of each of segments of said media other than said text media to be included in said output multimedia contents;
   a total playing time calculation unit for calculating a total playing time period of all said segments of said media other than said text media on the basis of said playing time period of each of said segments of said media other than said text media set in said segment playing time setting unit; and
   a repeat count setting processing unit for setting a repeat count of said media other than said text media on the basis of said display time period of said text media calculated in said text display time calculation processing unit and said total playing time period of all said segments of said media other than said text media,
   said contents conversion processing unit making a conversion of said media other than said text media included in said input multimedia contents on the basis of said repeat count set in said repeat count setting processing unit.

5. A multimedia contents converting apparatus configured to convert input multimedia contents oriented to a personal computer to be displayed on a screen with a predetermined size, including text media and media other than the text media, into output multimedia contents oriented to a portable terminal to be displayed on a screen with a size smaller than said predetermined size, said apparatus comprising:
   a text display time calculation processing unit for calculating a display time period of text media to be included in said output multimedia contents, on the basis of conversion instruction information;
   a spatiotemporal layout information setting processing unit for setting spatiotemporal layout information on said output multimedia contents on the basis of said conversion instruction information;
   a contents conversion processing unit for converting said input multimedia contents into said output multimedia contents on the basis of said spatiotemporal layout information;
   a segment playing time setting unit for setting a playing time period of each of segments of said media other than said text media to be included in said output multimedia contents;

a total playing time calculation unit for calculating a total playing time period of all said segments of said media other than said text media on the basis of said playing time period of each of said segments of said media other than said text media set in said segment playing time setting unit; and a repeat count setting processing unit for setting a repeat count of said media other than said text media on the basis of said display time period of said text media calculated in said text display time calculation processing unit and said total playing time period of all said segments of said media other than said text media, said contents conversion processing unit making a conversion of said media other than said text media included in said input multimedia contents on the basis of said repeat count set in said repeat count setting processing unit, said spatiotemporal layout information setting processing unit setting a display time period of said text media included in said spatiotemporal layout information, on the basis of said display time period of said text media calculated in said text display time calculation processing unit, and setting a playing time period of said media other than said text media included in said spatiotemporal layout information, on the basis of said display time period of said text media set as said spatiotemporal layout information, and wherein said repeat count setting processing unit sets, as said repeat count, n (n: integer) which satisfies a condition that, when said repeat count of said media other than said text media is taken as n, said playing time period of said media other than said text media becomes shorter than said display time period of said text media and, when said repeat count of said media other than said text media is taken as n+1, said playing time period of said media other than said text media becomes longer than said display time period of said text media.

6. A multimedia contents converting apparatus according to claim 5, wherein said spatiotemporal layout information setting processing unit is made such that, after the completion of n repeated playings, said media other than said text media is frozen until a display end time of said text media.

7. A multimedia contents converting apparatus, comprising:

a text display time calculation processing unit being configured to calculate a display time period of text media to be included in output multimedia contents on the basis of conversion instruction information;

a spatiotemporal layout information setting processing unit being configured to set spatiotemporal layout information on said output multimedia contents on the basis of said conversion instruction information; and a contents conversion processing unit being configured to convert input multimedia contents, including text media and media other than the text media, oriented to personal computer to be displayed on a screen of the personal computer with a predetermined size into said output multimedia contents oriented to portable terminal to be displayed on a screen of the portable terminal with a size smaller than said predetermined size on the basis of said spatiotemporal layout information, wherein said spatiotemporal layout information setting processing unit is configured to set a display time period of said text media included in said spatiotemporal layout information, on the basis of said display time period of said text media calculated in said text display time calculation processing unit, and set a playing time period of said media other than said text media included in said spatiotemporal layout information, on the basis of said display time period of said text media set as said spatiotemporal layout information, a segment playing time setting unit for setting a playing time period of each of segments of said media other than said text media to be included in said output multimedia contents;

a total playing time calculation unit for calculating a total playing time period of all said segments of said media other than said text media on the basis of said playing time period of each of said segments of said media other than said text media set in said segment playing time setting unit; and a repeat count setting processing unit for setting a repeat count of said media other than said text media on the basis of said display time period of said text media calculated in said text display time calculation processing unit and said total playing time period of all said segments of said media other than said text media, said contents conversion processing unit making a conversion of said media other than said text media included in said input multimedia contents on the basis of said repeat count set in said repeat count setting processing unit, wherein said repeat count setting processing unit sets, as said repeat count, n+1(n: integer) which satisfies a condition that, when said repeat count of said media other than said text media is taken as n, said playing time period of said media other than said text media becomes shorter than said display time period of said text media and, when said repeat count of said media other than said text media is taken as n+1, said playing time period of said media other than said text media becomes longer than said display time period of said text media.

8. A multimedia contents converting method, comprising:

a text display time calculation processing step calculating an adjusted display time period of said text media to be included in output multimedia contents on the basis of conversion instruction information;

a spatiotemporal layout information setting processing step setting spatiotemporal layout information on said output multimedia contents on the basis of said conversion instruction information; and a contents conversion processing step converting input multimedia contents, including text media and media other than the text media, oriented to a personal computer to be displayed on a screen of the personal computer with a predetermined size into said output multimedia contents oriented to portable terminal with a size smaller than said predetermined size on the basis of said spatiotemporal layout information, wherein, in said spatiotemporal layout information setting processing step, a display time period of said text media included in said spatiotemporal layout information is set on the basis of said display time period of said text media calculated in said text display time calculation processing step, and a playing time period of said media other than said text media included in said spatiotemporal layout information is modified and synchronized responsive to said display time period of said text media set as said spatiotemporal layout information.

9. A multimedia contents converting method according to claim 8, wherein, in said text display time calculation processing step, said display time period of said text media to be included in said output multimedia contents is calculated on the basis of text information obtained from said input multimedia contents and text display form information inputted as said conversion instruction information.

10. A multimedia contents converting method according to claim 8, wherein, in said spatiotemporal layout information setting processing step, a playing time period of said media other than said text media included in said spatiotemporal layout information is set to coincide with said display time period of said text media set as said spatiotemporal layout information.

11. A multimedia contents converting method according to claim 8, further comprising:
   a segment playing time setting step of modifying, synchronizing, and setting a playing time period of each of segments of said media other than said text media to be included in said output multimedia contents;
   a total playing time calculation step of calculating a total playing time period of all said segments of said media other than said text media on the basis of said playing time period of each of said segments of said media other than said text media set in said segment playing time setting step; and
   a repeat count setting processing step of setting a repeat count of said media other than said text media on the basis of said display time period of said text media calculated in said text display time calculation processing step and said total playing time period of all said segments of said media other than said text media,
   in said contents conversion processing step, a conversion of said media other than said text media included in said input multimedia contents is made on the basis of said repeat count set in said repeat count setting processing unit.

12. A computer-readable storage medium storing a multimedia contents conversion program, which makes a computer conduct the processing of converting input multimedia contents into output multimedia contents, the conversion processing comprising:
   a text display time calculation processing step calculating an adjusted display time period of text media included in said output multimedia contents on the basis of conversion instruction information;
   a spatiotemporal layout information setting processing step setting spatiotemporal layout information on said output multimedia contents on the basis of said conversion instruction information; and
   a contents conversion processing step converting input multimedia contents, including text media and media other than the text media, oriented to a personal computer to be displayed on a screen of the personal computer with predetermined size smaller that said predetermined size into said output multimedia contents on the basis of said spatiotemporal layout information,
   wherein in said spatiotemporal layout information setting processing step, a display time period of said text media included in said spatiotemporal layout information is set on the basis of said display time period of said text media calculated in said text display time calculation processing step, and a playing time period of said media other than said text media included in said spatiotemporal layout information is modified and synchronized responsive to said display time period of said text media set as the spatiotemporal layout information.

13. A computer-readable storage medium storing a multimedia contents conversion program according to claim 12, wherein, in said text display time calculation processing step, said program makes said computer conduct the processing of calculating said display time period of said text media to be included in said output multimedia contents on the basis of text information obtained from said input multimedia contents and text display form information inputted as said conversion instruction information.

14. A computer-readable storage medium storing a multimedia contents conversion program according to claim 12, wherein, in said spatiotemporal layout information setting processing step, said program makes said computer conduct the processing of setting a playing time period of said media other than said text media included in said spatiotemporal layout information to coincide with said display time period of said text media set as said spatiotemporal layout information.

15. A computer-readable storage medium storing a multimedia contents conversion program according to claim 12, wherein said program makes said computer conduct:
   a segment playing time setting step of modifying, synchronizing, and setting a playing time period of each of segments of said media other than said text media to be included in said output multimedia contents;
   a total playing time calculation step of calculating a total playing time period of all said segments of said media other than said text media on the basis of said playing time period of each of said segments of said media other than said text media set in said segment playing time setting step; and
   a repeat count setting processing step of setting a repeat count of said media other than said text media on the basis of said display time period of said text media calculated in said text display time calculation processing step and said total playing time period of all said segments of said media other than said text media, and
   in said contents conversion processing step, said program makes said computer conduct the processing of making a conversion of said media other than said text media included in said input multimedia contents on the basis of said repeat count set in said repeat count setting processing unit.

* * * * *